(12) United States Patent
Kimmel et al.

(10) Patent No.: US 6,462,934 B2
(45) Date of Patent: Oct. 8, 2002

(54) METHODS TO PARTIALLY REDUCE A NIOBIUM METAL OXIDE AND OXYGEN REDUCED NIOBIUM OXIDES

(75) Inventors: Jonathon L. Kimmel, Audubon; Ricky W. Kitchell., Douglassville, both of PA (US); James A. Fife, Myrtle Beach, SC (US)

(73) Assignee: Cabot Corporation, Boston, MA (US)

(*) Notice: Subject to any disclaimer, the term of this patent is extended or adjusted under 35 U.S.C. 154(b) by 0 days.

(21) Appl. No.: 09/758,705

(22) Filed: Jan. 11, 2001

(65) Prior Publication Data

US 2001/0036056 A1 Nov. 1, 2001

Related U.S. Application Data

(63) Continuation-in-part of application No. 09/533,430, filed on Mar. 23, 2000, now Pat. No. 6,373,685, which is a continuation-in-part of application No. 09/347,990, filed on Jul. 6, 1999, which is a continuation-in-part of application No. 09/154,452, filed on Sep. 16, 1998.

(51) Int. Cl.[7] .......................... H01G 9/00; B32B 18/00
(52) U.S. Cl. .................. 361/508; 361/528; 29/25.03; 428/702
(58) Field of Search ................ 361/508, 509, 361/528, 529; 428/702, 469, 472; 29/25.03

(56) References Cited

U.S. PATENT DOCUMENTS

| | | |
|---|---|---|
| 1,415,516 A | 5/1922 | Bridge |
| 1,906,184 A | 4/1933 | Bohn |
| 2,183,517 A | 12/1939 | Leemans et al. ............... 75/135 |
| 2,242,759 A | 5/1941 | Schlecht et al. ............... 75/84 |
| 2,443,254 A | 6/1948 | Kroll et al. .................... 423/62 |
| 2,621,137 A | 12/1952 | Miller ....................... 148/13.1 |
| 2,700,606 A | 1/1955 | Wilhelm et al. ............... 75/84 |
| 2,761,776 A | 9/1956 | Bichowsky ..................... 75/5 |
| 2,861,882 A | 11/1958 | Bichowsky ................... 75/84 |
| 2,937,939 A | 5/1960 | Wilhelm et al. .............. 75/84 |
| 2,992,095 A | 7/1961 | Li .............................. 75/27 |
| 3,421,195 A | 1/1969 | Berryhill ................. 29/25.42 |
| 3,647,420 A | 3/1972 | Restelli ....................... 75/84 |
| 3,926,832 A | 12/1975 | Barosi .................... 252/181.6 |
| 4,032,328 A | 6/1977 | Hurd ........................ 75/84.1 |
| 4,126,493 A | 11/1978 | Wurm ......................... 148/20 |
| 4,201,798 A | 5/1980 | Lindmayer ................... 427/74 |
| 4,406,699 A | 9/1983 | Beck et al. .................. 75/233 |
| 4,428,856 A | 1/1984 | Boyarina et al. ........ 252/181.1 |

(List continued on next page.)

FOREIGN PATENT DOCUMENTS

| | | |
|---|---|---|
| AU | 104631 | 8/1937 |
| GB | 485318 | 5/1938 |
| GB | 489742 | 8/1938 |
| GB | 835316 | 5/1960 |
| WO | WO 00/15556 | 9/1999 |
| WO | WO 00/15555 | 3/2000 |

OTHER PUBLICATIONS

Abstract Document No. 129:284714, 1998, no month.
Abstract Document No. 129:130191, 1998, no month.
Abstract Document No. 128:288971, 1998, no month.
Abstract Document No. 85:170443, 1976, no month.
Abstract Document No. 83:140466, 1975, no month.

(List continued on next page.)

*Primary Examiner*—Anthony Dinkins

(57) ABSTRACT

Methods to at least partially reduce a niobium oxide are described wherein the process includes heat treating the niobium oxide in the presence of a getter material and in an atmosphere which permits the transfer of oxygen atoms from the niobium oxide to the getter material, and for a sufficient time and at a sufficient temperature to form an oxygen reduced niobium oxide. Niobium oxides and/or suboxides are also described as well as capacitors containing anodes made from the niobium oxides and suboxides.

40 Claims, 19 Drawing Sheets

U.S. PATENT DOCUMENTS

| | | | |
|---|---|---|---|
| 4,722,756 A | 2/1988 | Hard | 148/126.1 |
| 4,748,737 A | 6/1988 | Charles et al. | 29/599 |
| 4,923,531 A | 5/1990 | Fisher | 148/126.1 |
| 4,960,471 A | 10/1990 | Fife | 148/20.3 |
| 5,013,357 A | 5/1991 | Worcester et al. | 75/622 |
| 5,022,935 A | 6/1991 | Fisher | 148/126.1 |
| 5,171,379 A | 12/1992 | Kumar et al. | 148/422 |
| 5,412,533 A | 5/1995 | Murayama et al. | 361/528 |
| 5,448,447 A | 9/1995 | Chang | 361/529 |
| 5,825,611 A | 10/1998 | Pozdeev | 361/524 |
| 5,993,513 A | 11/1999 | Fife | 75/743 |
| 6,007,597 A | 12/1999 | Puopolo et al. | 75/10.14 |
| 6,051,044 A | 4/2000 | Fife | 75/229 |
| 6,051,326 A | 4/2000 | Fife | 428/610 |
| 6,322,912 B1 * | 11/2001 | Fife | 361/528 |

OTHER PUBLICATIONS

Abstract Document No. 104:229152, 1986, no month.

Abstract Document No. 104:198128, 1986, no month.

Abstract Document No. 108:122980, 1988, no month.

Abstract Document No. 106:42412, 1987, no month.

Abstract Document No. 110:224093, 1989, no month.

Abstract Document No. 109:103212, 1988, no month.

Abstract Document No. 116:199338, 1992, no month.

Abstract Document No. 113:10823, 1990, no month.

Abstract Document No. 120:179957, 1994, no month.

Abstract Document No. 119:84165, 1993, no month.

Abstract Document No. 118:86049, 1993, no month.

Acrivos, et al., "Dynamic phenomena in Superconducting oxides Measured by ESR" Phys. Rev. B: Condens. Matter, 50(18), pp. 12710–12723. (1994).

Acrivos, et al., "Dynamics of Flux Motion..." Physica C(Amsterdam) 234–40(Pt. 5), pp. 3159–3160. (1994).

Bauer, George, "The Oxides of Niobium," Zeitschrift fuer anorganische und allgemeine Chemie, vol. 248, No. 1. (Sep. 1941) (w/full English Translation).

Feschotte, et al., "Niobium Physico–Chemical Properties Of TTS Compounds and Alloys" Atomic Energy Review, Special Issue No. 2. International Atomic Energy Agency—Vienna (1968). pp. 57–59.

International Search Report for PCT/US99/21413 mailed Sep. 16, 1999.

Kuz'micheva, et al., "Superconductivity in Lathanide–Strontium–Niobium–Oxide Systems" Sh. Neorg. Khim. 38(1), 162–6. (1993).

Mellor "Inorganic and Theoretical Chemistry" vol. IX, pp. 856–857, no date.

Pages 59, 65, and 66 of "Encyclopedia of Chemical Technology," vol. 17, $4^{th}$ Edition, no date.

Vest et al., "Electrical Conductivity in Ceramics and Glass" Department of the Air Force, Aerospace Research Laboratories Wright–Patterson Air Force Base, Ohio. pp. 375–384. (1974).

Young article, pp. 4 and 5 of Chapter 2, no date, no citation.

U.S. Patent Application No. 09/451,452.

U.S. Patent Application No. 09/347,990.

U.S. Patent Application No. 09/533430.

* cited by examiner

METHODS TO PARTIALLY REDUCE A NIOBIUM METAL OXIDE AND OXYGEN REDUCED NIOBIUM OXIDES

This application is a continuation-in-part of U.S. patent application Ser. No. 09/533,430 filed Mar. 23, 2000 now U.S. Pat. No. 6,373,685 and also is a continuation-in-part of U.S. patent application Ser. No. 09/347,990 filed Jul. 6, 1999, and U.S. patent application Ser. No. 09/154,452 filed Sep. 16, 1998, which are all incorporated herein in their entirety by reference.

BACKGROUND OF THE INVENTION

The present invention relates to niobium and oxides thereof and more particularly relates to niobium oxides and methods to at least partially reduce niobium oxide and further relates to oxygen reduced niobium.

SUMMARY OF THE PRESENT INVENTION

In accordance with the purposes of the present invention, as embodied and described herein, the present invention relates to a method to at least partially reduce a niobium oxide which includes the steps of heat treating the niobium oxide in the presence of a getter material and in an atmosphere which permits the transfer of oxygen atoms from the niobium oxide to the getter material for a sufficient time and temperature to form an oxygen reduced niobium oxide.

The present invention also relates to oxygen reduced niobium oxides which preferably have beneficial properties, especially when formed into an electrolytic capacitor anode. For instance, a capacitor made from the oxygen reduced niobium oxide of the present invention can have a capacitance of up to about 200,000 CV/g or more. Further, electrolytic capacitor anodes made from the oxygen reduced niobium oxides of the present invention can have a low DC leakage. For instance, such a capacitor can have a DC leakage of from about 0.5 nA/CV to about 5.0 nA/CV.

Accordingly, the present invention also relates to methods to increase capacitance and reduce DC leakage in capacitors made from niobium oxides, which involves partially reducing a niobium oxide by heat treating the niobium oxide in the presence of a getter material and in an atmosphere which permits the transfer of oxygen atoms from the niobium oxide to the getter material, for a sufficient time and temperature to form an oxygen reduced niobium oxide, which when formed into a capacitor anode, has reduced DC leakage and/or increased capacitance.

The present invention further relates to capacitor anodes containing the niobium oxides of the present invention and having other beneficial properties.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
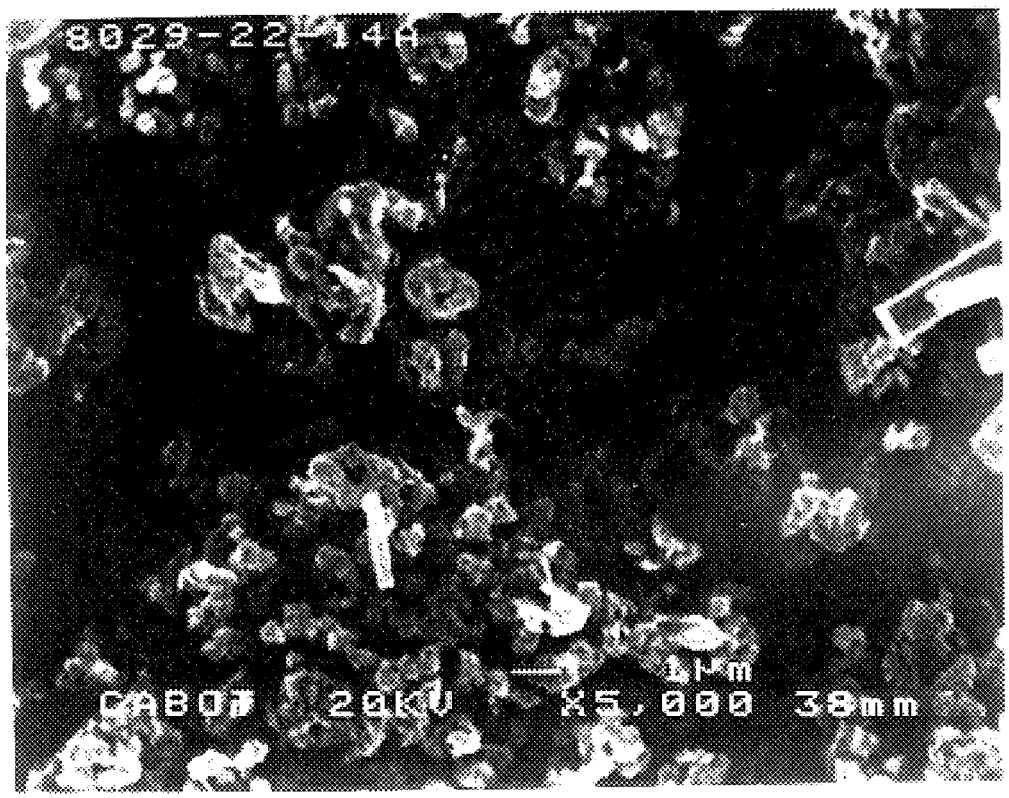
FIGS. 1–11 are SEMs of various oxygen reduced niobium oxides of the present invention at various magnifications.

In an embodiment of the present invention, the present invention relates to methods to at least partially reduce a niobium oxide. In general, the method includes the steps of heat treating a starting niobium oxide in the presence of a getter material in an atmosphere which permits the transfer of oxygen atoms from the niobium oxide to the getter material for a sufficient time and at a sufficient temperature to form an oxygen reduced niobium oxide.

For purposes of the present invention, the niobium oxide can be at least one oxide of niobium metal and/or alloys thereof. A specific example of a starting niobium oxide is $Nb_2O_5$.

The niobium oxide used in the present invention can be in any shape or size. Preferably, the niobium oxide is in the form of a powder or a plurality of particles. Examples of the type of powder that can be used include, but are not limited to, flaked, angular, nodular, and mixtures or variations thereof. Preferably, the niobium oxide is in the form of a powder which more effectively leads to the oxygen reduced niobium oxide.

Examples of such preferred niobium oxide powders include those having mesh sizes of from about 60/100 to about 100/325 mesh and from about 60/100 to about 200/325 mesh. Another range of size is from −40 mesh to about −325 mesh.

The getter material for purposes of the present invention is any material capable of reducing the specific starting niobium oxide to the oxygen reduced niobium oxide. Preferably, the getter material comprises tantalum, niobium, or both. More preferably, the getter material is niobium. The niobium getter material for purposes of the present invention is any material containing niobium metal which can remove or reduce at least partially the oxygen in the niobium oxide. Thus, the niobium getter material can be an alloy or a material containing mixtures of niobium metal with other ingredients. Preferably, the niobium getter material is predominantly, if not exclusively, niobium metal. The purity of the niobium metal is not important but it is preferred that high purity niobium metal comprise the getter material to avoid the introduction of other impurities during the heat treating process. Accordingly, the niobium metal in the niobium getter material preferably has a purity of at least about 98% and more preferably at least about 99%. Further, it is preferred that impurities such as oxygen are not present or are present in amounts below about 100 ppm.

The getter material can be in any shape or size. For instance, the getter material can be in the form of a tray which contains the niobium oxide to be reduced or can be in a particle or powder size. Preferably, the getter materials are in the form of a powder in order to have the most efficient surface area for reducing the niobium oxide. The getter material, thus, can be flaked, angular, nodular, and mixtures or variations thereof. The getter material can be a tantalum hydride material. A preferred form is coarse chips, e.g., 14/40 mesh chips that can be easily separated from the powder product by screening.

Similarly, the getter material can be tantalum and the like and can have the same preferred parameters and/or properties discussed above for the niobium getter material. Other getter materials can be used alone or in combination with the tantalum or niobium getter materials. Also, other materials can form a part of the getter material.

Generally, a sufficient amount of getter material is present to at least partially reduce the niobium oxide being heat treated. Further, the amount of the getter material is dependent upon the amount of reducing desired to the niobium oxide. For instance, if a slight reduction in the niobium oxide is desired, then the getter material will be present in a stoichemetric amount. Similarly, if the niobium oxide is to be reduced substantially with respect to its oxygen presence, then the getter material is present in a 2 to 5 times stoichemetric amount. Generally, the amount of getter material present (e.g., based on the tantalum getter material being 100% tantalum) can be present based on the following ratio of getter material to the amount of niobium oxide present of from about 2 to 1 to about 10 to 1.

Furthermore, the amount of getter material can also be dependent on the type of niobium oxide being reduced. For instance, when the niobium oxide being reduced is $Nb_2O_5$, the amount of getter material is preferably 5 to 1.

The heat treating that the starting niobium oxide is subjected to can be conducted in any heat treatment device or furnace commonly used in the heat treatment of metals, such as niobium and tantalum. The heat treatment of the niobium oxide in the presence of the getter material is at a sufficient temperature and for a sufficient time to form an oxygen reduced niobium oxide. The temperature and time of the heat treatment can be dependent on a variety of factors such as the amount of reduction of the niobium oxide, the amount of the getter material, and the type of getter material as well as the type of starting niobium oxide. Generally, the heat treatment of the niobium oxide will be at a temperature of from less than or about 800° C. to about 1900° C. and more preferably from about 1000° C. to about 1400° C., and most preferably from about 1200° C. to about 1250° C. In more detail, when the niobium oxide is a niobium containing oxide, the heat treatment temperatures will be from about 1000° C. to about 1300° C., and more preferably from about 1200° C. to about 1250° C. for a time of from about 5 minutes to about 100 minutes, and more preferably from about 30 minutes to about 60 minutes. Routine testing in view of the present application will permit one skilled in the art to readily control the times and temperatures of the heat treatment in order to obtain the proper or desired reduction of the niobium oxide.

The heat treatment occurs in an atmosphere which permits the transfer of oxygen atoms from the niobium oxide to the getter material. The heat treatment preferably occurs in a hydrogen containing atmosphere where is preferably just hydrogen. Other gases can also be present with the hydrogen, such as inert gases, so long as the other gases do not react with the hydrogen. Preferably, the hydrogen atmosphere is present during the heat treatment at a pressure of from about 10 Torr to about 2000 Torr, and more preferably from about 100 Torr to about 1000 Torr, and most preferably from about 100 Torr to about 930 Torr. Mixtures of $H_2$ and an inert gas such as Ar can be used. Also, $H_2$ in $N_2$ can be used to effect control of the $N_2$ level of the niobium oxide.

During the heat treatment process, a constant heat treatment temperature can be used during the entire heat treating process or variations in temperature or temperature steps can be used. For instance, hydrogen can be initially admitted at 1000° C. followed by increasing the temperature to 1250° C. for 30 minutes followed by reducing the temperature to 1000° C. and held there until removal of the $H_2$ gas. After the $H_2$ or other atmosphere is removed, the furnace temperature can be dropped. Variations of these steps can be used to suit any preferences of the industry.

The oxygen reduced niobium oxides can also contain levels of nitrogen, e.g., from about 100 ppm to about 80,000 ppm $N_2$ or to about 130,000 ppm $N_2$. Suitable ranges includes from about 31,000 ppm $N_2$ to about 130,000 ppm $N_2$ and from about 50,000 ppm $N_2$ to about 80,000 $N_2$.

The oxygen reduced niobium oxide is any niobium oxide which has a lower oxygen content in the metal oxide compared to the starting niobium oxide. Typical reduced niobium oxides comprise NbO, $NbO_{0.7}$, $NbO_{1.1}$, $NbO_2$, and any combination thereof with or without other oxides present. Generally, the reduced niobium oxide of the present invention has an atomic ratio of niobium to oxygen of about 1:less than 2.5, and preferably 1:2 and more preferably 1:1.1, 1:1, or 1:0.7. Put another way, the reduced niobium oxide preferably has the formula $Nb_xO_y$, wherein Nb is niobium, x is 2 or less, and y is less than 2.5x. More preferably x is 1 and y is less than 2, such as 1.1, 1.0, 0.7, and the like.

The starting niobium oxides can be prepared by calcining at 1000° C. until removal of any volatile components. The oxides can be sized by screening. Preheat treatment of the niobium oxides can be used to create controlled porosity in the oxide particles.

The reduced niobium oxides of the present invention also preferably have a microporous surface and preferably have a sponge-like structure, wherein the primary particles are preferably 1 micron or less. The SEMs further depict the type of preferred reduced niobium oxide of the present invention. As can be seen in these microphotographs, the reduced niobium oxides of the present invention can have high specific surface area, and a porous structure with approximately 50% porosity. Further, the reduced niobium oxides of the present invention can be characterized as having a preferred specific surface area of from about 0.5 to about 10.0 m²/g, more preferably from about 0.5 to 2.0 m²/g, and even more preferably from about 1.0 to about 1.5 m²/g. The preferred apparent density of the powder of the niobium oxides is less than about 2.0 g/cc, more preferably, less than 1.5 g/cc and more preferably, from about 0.5 to about 1.5 g/cc.

The various oxygen reduced niobium oxides of the present invention can be further characterized by the electrical properties resulting from the formation of a capacitor anode using the oxygen reduced niobium oxides of the present invention. In general, the oxygen reduced niobium oxides of the present invention can be tested for electrical properties by pressing powders of the oxygen reduced niobium oxide into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the oxygen reduced niobium oxides of the present invention. Anodes can be made from the powdered form of the reduced oxides in a similar process as used for fabricating metal anodes, i.e., pressing porous pellets with embedded lead wires or other connectors followed by optional sintering and anodizing. The lead connector can be embedded or attached at any time before anodizing. Anodes made from some of the oxygen reduced niobium oxides of the present invention can have a capacitance of from about 1,000 CV/g or lower to about 300,000 CV/g or more, and other ranges of capacitance can be from about 20,000 CV/g to about 300,000 CV/g or from about 62,000 CV/g to about 200,000 CV/g and preferably from about 60,000 to 150,000 CV/g. In forming the capacitor anodes of the present invention, a sintering temperature can be used which will permit the formation of a capacitor anode having the desired properties. The sintering temperature will be based on the oxygen reduced niobium oxide used. Preferably, the sintering temperature is from about 1200° C. to about 1750° C. and more preferably from about 1200° C. to about 1400° C. and most preferably from about 1250° C. to about 1350° C. when the oxygen reduced niobium oxide is an oxygen reduced niobium oxide.

The anodes formed from the niobium oxides of the present invention are preferably formed at a voltage of about 35 volts and preferably from about 6 to about 70 volts. When an oxygen reduced niobium oxide is used, preferably, the forming voltages are from about 6 to about 50 volts, and more preferably from about 10 to about 40 volts. Other high formation voltages can be used such as from about 70 volts to about 130 volts. The DC leakage achieved by the niobium oxides of the present invention have provided excellent low leakage at high formation voltages. This low leakage is significantly better than capacitors formed with Nb powder as can be seen in, for instance, FIG. 12. Anodes of the reduced niobium oxides can be prepared by fabricating a pellet of $Nb_2O_5$ with a lead wire followed by sintering in $H_2$ atmosphere or other suitable atmosphere in the proximity of a getter material just as with powdered oxides. In this embodiment, the anode article produced can be produced directly, e.g., forming the oxygen reduced valve metal oxide and an anode at the same time. Also, the anodes formed from the oxygen reduced niobium oxides of the present invention preferably have a DC leakage of less than about 5.0 nA/CV. In an embodiment of the present invention, the anodes formed from some of the oxygen reduced niobium oxides of the present invention have a DC leakage of from about 5.0 nA/CV to about 0.50 nA/CV.

The present invention also relates to a capacitor in accordance with the present invention having a niobium oxide film on the surface of the capacitor. Preferably, the film is a niobium pentoxide film. The means of making metal powder into capacitor anodes is known to those skilled in the art and such methods such as those set forth in U.S. Pat. Nos. 4,805,074, 5,412,533, 5,211,741, and 5,245,514, and European Application Nos. 0 634 762 A1 and 0 634 761 A1, all of which are incorporated in their entirety herein by reference.

The capacitors of the present invention can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like.

Preferably, the niobium suboxide of the present invention is a NbO or oxygen depleted NbO or an aggregate or agglomerate which contains NbO and niobium metal or niobium metal with a rich oxygen content. Unlike NbO, $NbO_2$ is undesirable due to its resistive nature, whereas NbO is very conductive. Accordingly, capacitor anodes which are formed from NbO or oxygen depleted NbO or a mixture of NbO with niobium metal are desirable and preferred for purposes of the present invention.

In making the niobium oxides of the present invention, and preferably NbO or variations thereof, hydrogen gas is preferably used as the carrier wherein oxygen is transferred from the starting niobium material, namely $Nb_2O_5$ to Nb with the use of the $H_2$ gas as the carrier. The preferred reaction scheme is as follows:

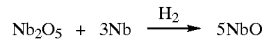

$$Nb_2O_5 + 3Nb \xrightarrow{H_2} 5NbO$$

As can be seen, using a niobium metal as the getter material, the getter material along with the starting niobium oxide can all result into the final product which is preferably NbO. In more detail, there are typically two processes involved in preparing the niobium suboxides of the present invention. One process involves the preparation of the getter material and the other part of the process involves the use of the getter material along with the starting niobium oxide to form the niobium suboxide of the present invention. In preparing the getter material, which is preferably niobium powder, a niobium ingot is subjected to a hydriding process in order to harden the niobium metal for purposes of crushing the ingot into powder which is subsequently subjected to a screen in order to obtain a uniform particle distribution which is preferably from about 5 to about 300 microns in size. If needed, the powder can be subjected two or more times to the crusher in order to achieve the desired uniform particle distribution. Afterwards, the powder is then subjected to milling in order to obtain the desired particle size which is from about 1 to about 5 microns in size. After milling, the material is preferably leached with acid in order to remove impurities and then the material is subjected to drying to obtain the niobium getter powder.

This niobium getter powder is then mixed with or blended with the starting niobium oxide material, which is preferably $Nb_2O_5$, and subjected to a hydrogen heat treatment which preferably occurs at a temperature of from about 900 to about 1,200 with the hydrogen pressure being from about 50 Torr to about 900 Torr. Preferably, the starting niobium oxide is -325 mesh. Preferably, the heat treatment occurs for a sufficient time to achieve the reaction set forth above which is the full conversion of the getter material and the starting metal oxide to the final product which is preferably NbO. Thus, in this process, the getter material as well as the starting metal oxide all become the final product.

Figure 13:
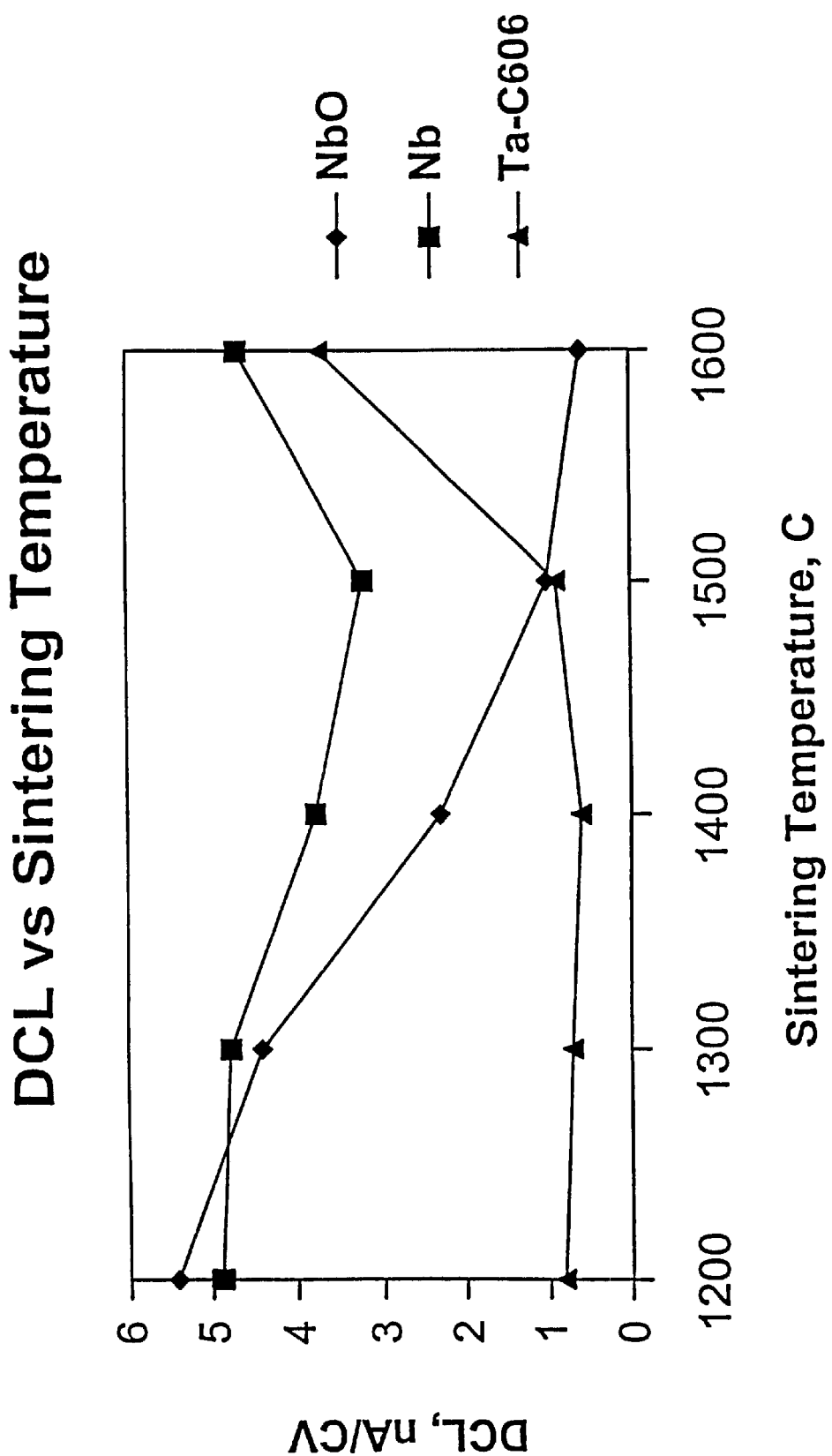
FIGS. 13 and 14 are graphs showing a DCL and capacitance comparison of an anode containing niobium oxide compared to anodes containing niobium flake and tantalum.

The sintering properties of the anode formed from the niobium suboxides of the present invention show that the present invention provides an anode which has DC leakage capability comparable to tantalum when sintered at high temperatures but, unlike other metals, is less prone to capacitance lost during sintering. These favorable properties are set forth in FIGS. 13 and 14 which show a comparison of the preferred niobium oxide of the present invention compared to an anode formed from niobium flake and an anode formed from tantalum. As can be seen in FIG. 13, the anode formed from the niobium oxide of the present invention showed satisfactory DC leakage when the anode was sintered at temperatures of from about 1200 to 1600° C. or higher whereas an anode formed from niobium metal showed a higher DC leakage for sintering temperatures of from about 1200 to 1600° C. with no significant drop in DC leakage at high temperatures, such as 1400 to 1600° C.

Figure 14:
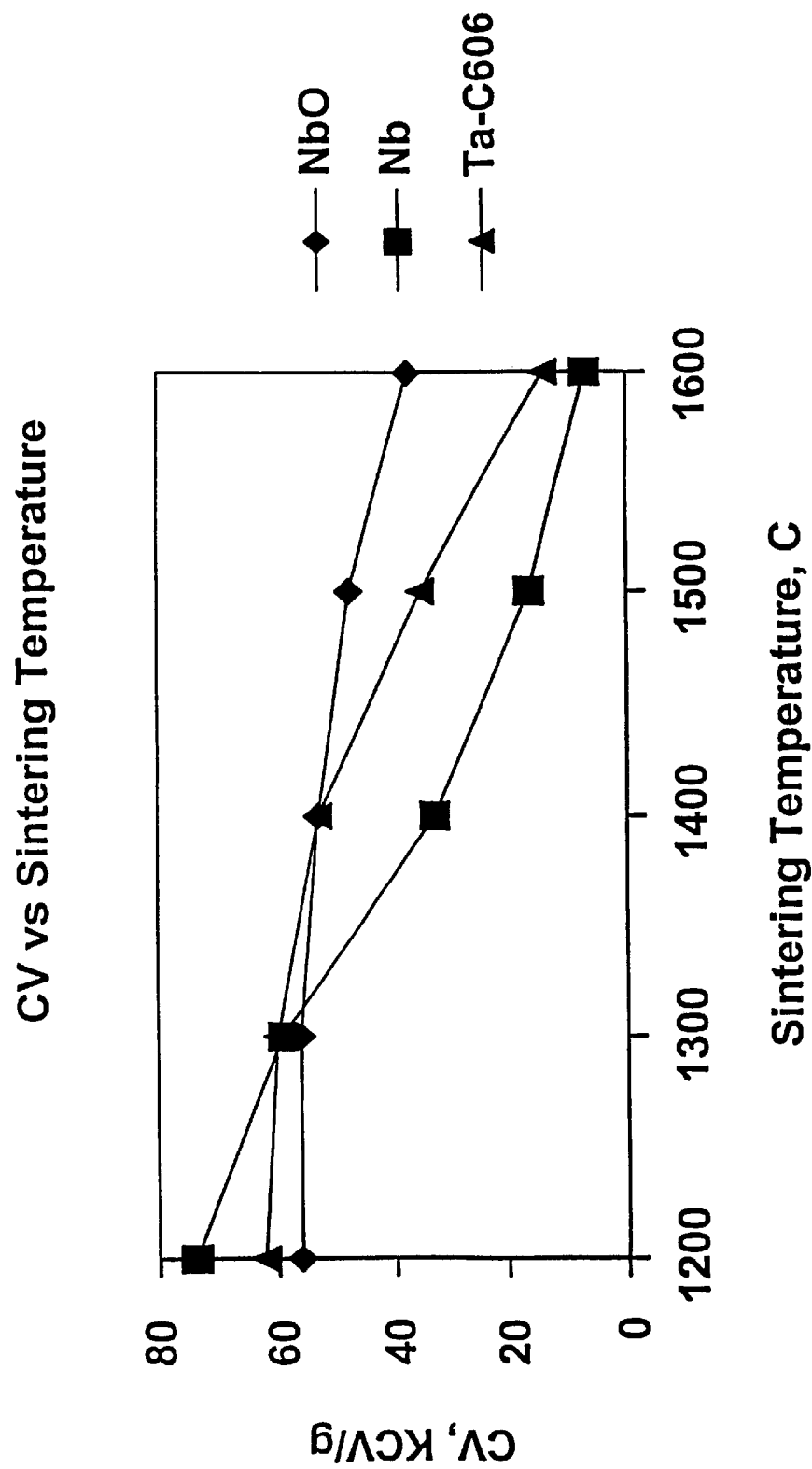

Also, as shown in FIG. 14, when an anode made from niobium metal was sintered at temperatures of from 1200 to 1600° C. and then capacitance tested with a wet anode, the capacitance steadily declined as the sintering temperature increased to the point where the capacitance was about 10,000 CV/g at a sintering temperature of about 1600° C. Unlike niobium metal, when an anode made from the niobium suboxides of the present invention was tested, the capacitance was fairly steady when sintered at a variety of temperatures of from 1200 to about 1600° C. There was only a slight drop at these higher temperatures. This is even different from an anode made from tantalum which showed a significant drop after sintering at 1400° C. Accordingly, the anodes formed from the niobium suboxides of the present invention showed excellent resistance to DC leakage as well as an ability to resist capacitance loss at higher sintering temperatures.

The anodes formed from the niobium suboxides of the present invention further showed an ability to have a low DC leakage even with high formation voltages. In addition, the capacitance of the anodes formed from the niobium suboxides of the present invention showed high capacitance for a variety of formation voltages such as from 20 to 60 volts.

Figure 15:
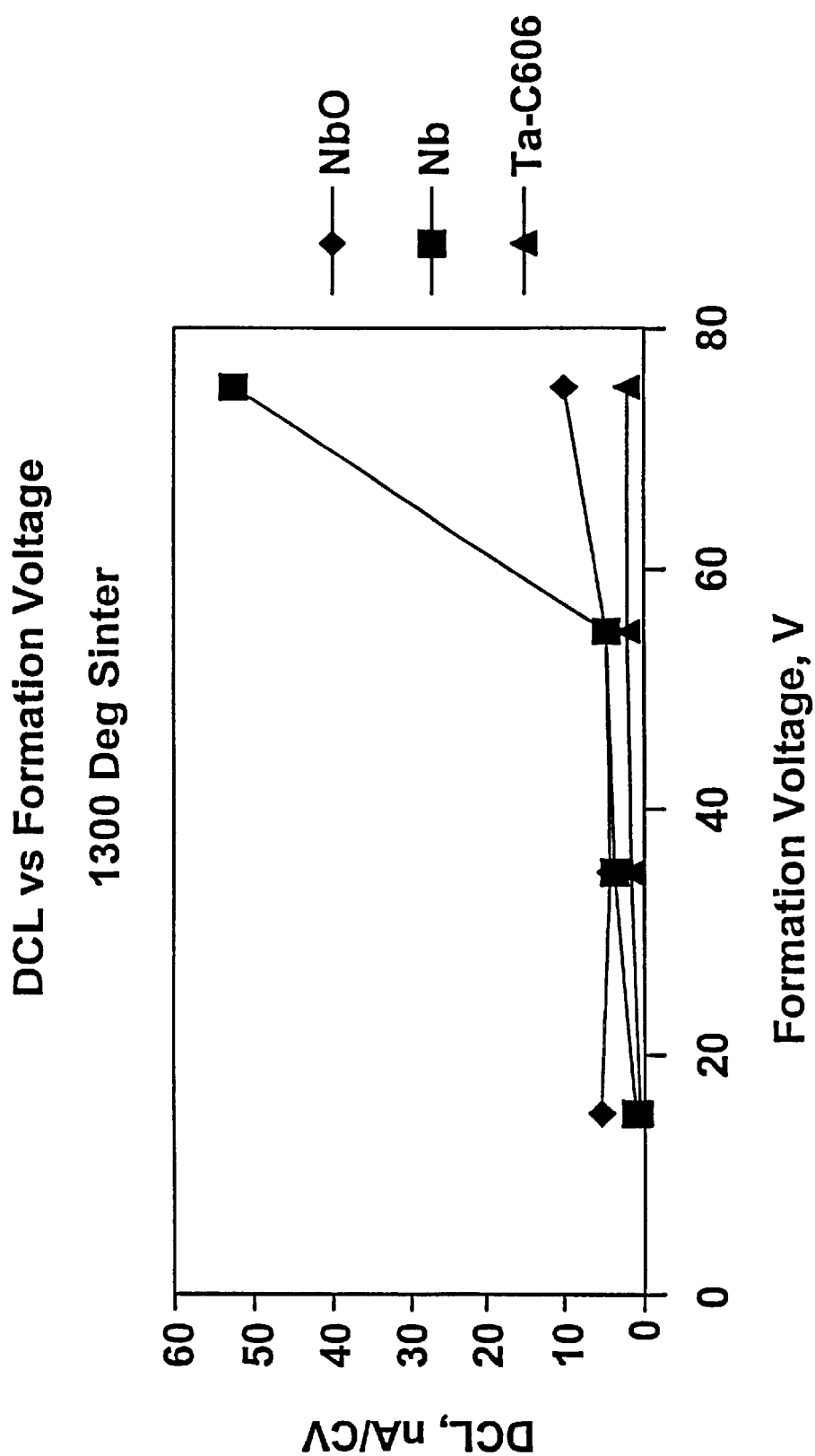
FIG. 15 is a graph showing DC leakage for anodes formed from niobium suboxides of the present invention.
Figure 16:
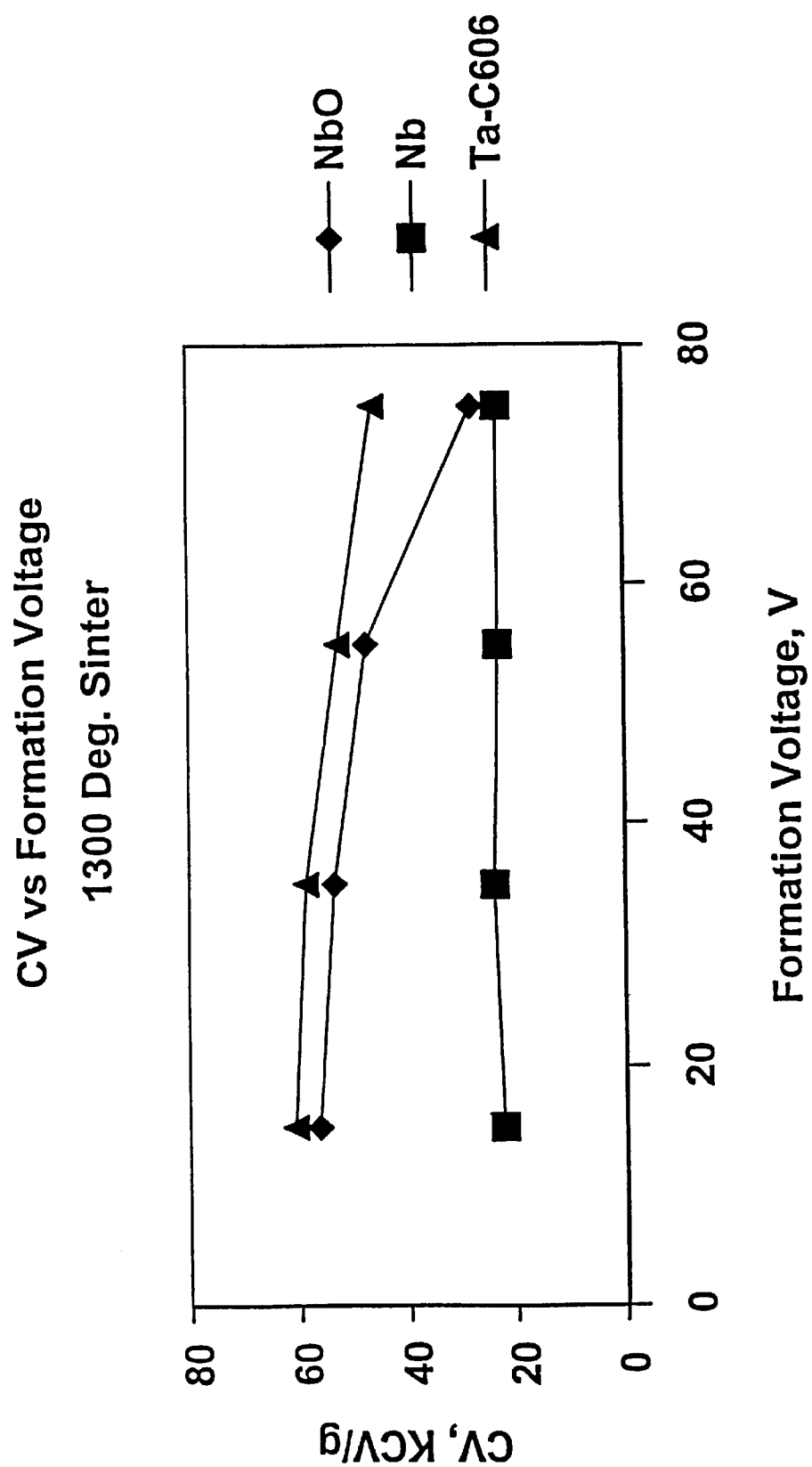
FIG. 16 is a graph showing the capacitance from a wet anodes formed from niobium oxide and tantalum.

In more detail, as shown in FIG. 15 of the present application, when anodes formed from the niobium suboxides of the present invention were tested for DC leakage, the DC leakage was below 10 nA/CV for formation voltages from under 20 to over 60 volts which is quite different from anodes formed from niobium metal which show a dramatic increase in DC leakage when formation voltages exceeded 50 volts. Further, as shown in FIG. 16, the capacitance from a wet anode formed from niobium oxide was comparable to tantalum at formation voltages of from 20 to 60 volts. These tests and FIGS. 15 and 16 show that the niobium suboxides can be formed into anodes and be used in capacitors rated up to 20 volts unlike capacitors using niobium metal which are rated below 10 volts.

Figure 17:
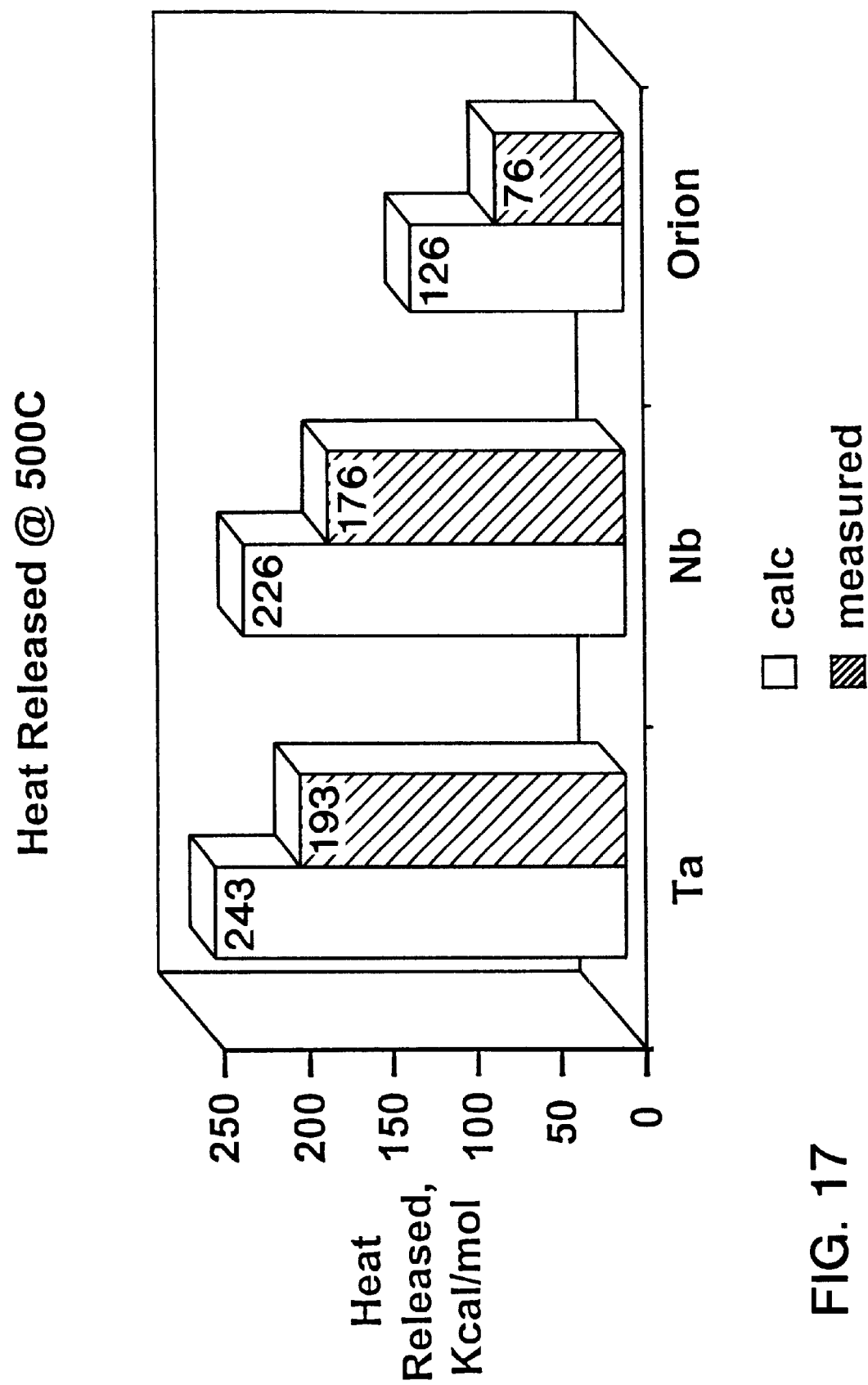
FIGS. 17 and 18 are graphs showing the flammability of anodes from niobium, tantalum, and niobium oxide.
Figure 18:
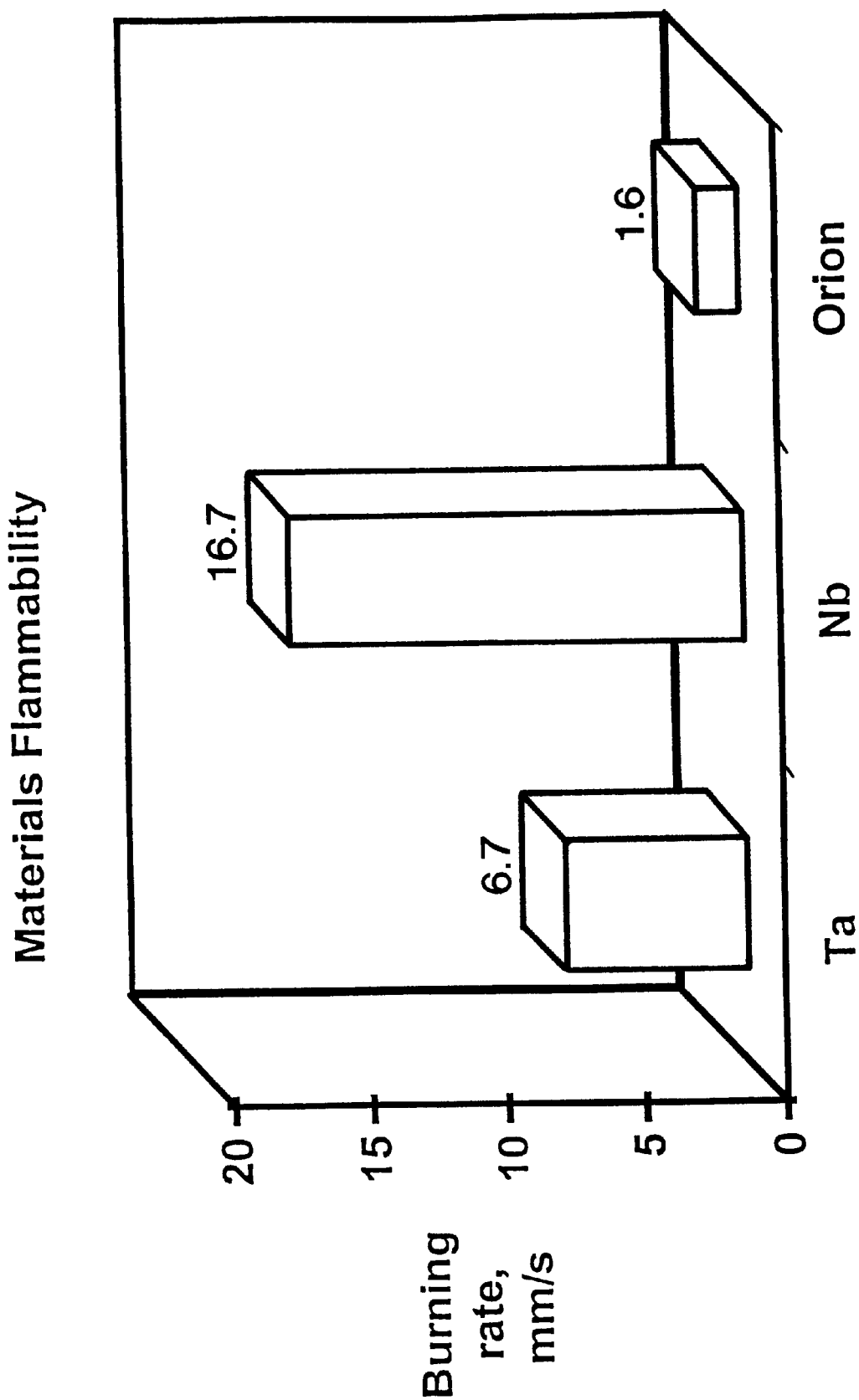
Figure 19:
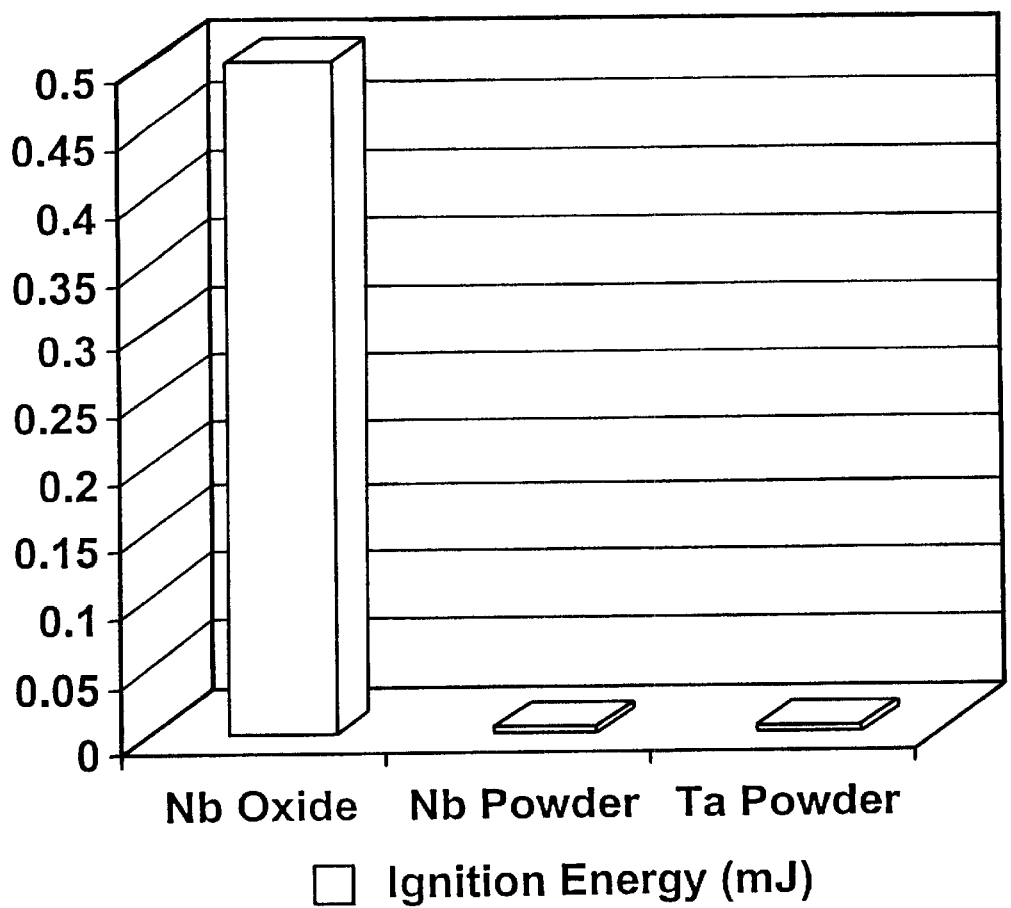
FIG. 19 is a graph showing the ignition energy needed to ignite niobium oxide powders compared to niobium powders and tantalum powders.

In addition, as shown in FIGS. 17 and 18, anodes formed from niobium suboxides are far less flammable than anodes formed from niobium or tantalum. As FIG. 17 shows, the heat released from an anode formed from the niobium suboxides of the present invention is considerably lower with regard to heat released at 500° C. than tantalum and niobium anodes. Furthermore, the flammability of the niobium oxides of the present invention is significantly lower than the flammability or burning rate of tantalum or niobium, as shown in FIG. 18. The burning rate is determined by Reference Test EEC Directive 79/831 ANNEX Part A from Chilworth Technology Inc. Also, the ignition energy (mJ) needed to ignite niobium oxide powders is significantly higher than the ignition energy needed to ignite niobium powder or tantalum powder as shown in FIG. 19. From such data, the niobium oxide of the present invention did not ignite at 500 mJ but ignited at an energy level of 10 J (a significantly higher amount of energy). On the other hand, both niobium and tantalum powders ignited at less than 3 mJ.

The capacitor anodes of the present invention which contain the niobium suboxides of the present invention are preferably prepared by pressing niobium oxide powder into the shape of a capacitor anode and sintering the anode at a temperature of from about 1200° C. to about 1600° C. for a time of from about 1 minute to about 30 minutes. Afterwards, the anode is then anodized at a formation voltage of from about 16 volts to about 75 volts preferably at a formation temperature of about 85° C. Other formation temperatures can be used such as from 50° C. to 100 ° C. Afterwards, the anode is then annealed at a annealing temperature of from about 300° C. to about 350° C. for a time of from about 10 minutes to about 60 minutes. Once this annealing is completed, the anode is again anodized at the same or slightly lower (5–10% lower) formation voltage than it is exposed to. The second formation lasts from about 10 minutes to 120 minutes at about 85° C. The anode is then preferably manganized at a temperature of from about 220° C. to about 280° C. for a time of from about 1 minute to about 30 minutes.

The present invention further relates to methods to at least partially reduce a niobium oxide. Preferably, the method involves heat treating a starting niobium oxide in the presence of a getter material in an atmosphere which permits the transfer of oxygen atoms from the starting niobium oxide to the getter material for a sufficient time and a sufficient temperature to form an oxygen reduced niobium oxide. Preferably, the oxygen reduced niobium oxide is NbO, depleted NbO, or a niobium metal with NbO. As stated earlier, preferably the getter material is a niobium metal and more preferably a niobium powder. In the preferred process, the getter material converts to the oxygen reduced niobium oxide as well. Thus, the getter material also forms part of the final product.

The present invention will be further clarified by the following examples, which are intended to be exemplary of the present invention.

TEST METHODS

Anode Fabrication:

size - 0.197" dia
3.5 Dp
powder wt = 341 mg
Anode Sintering:

1300° C. 10'
1450° C. 10'
1600° C. 10'
1750° C. 10'
30 V Ef Anodization:

30 V Ef @ 60° C./0.1% $H_3PO_4$ Electrolyte
20 mA/g constant current
DC Leakage/Capacitance - ESR Testing:

DC Leakage Testing ---

70% Ef (21 VDC) Test Voltage
60 second charge time
10% $H_3PO_4$ @ 21° C.
Capacitance - DF Testing:

18% $H_2SO_4$ @ 21° C.
120 Hz
50 V Ef Reform Anodization:

50 V Ef @ 60° C./0.1% $H_3PO_4$ Electrolyte
20 mA/g constant current
DC Leakage/Capacitance - ESR Testing:

DC leakage Testing ---

70% Ef (35 VDC) Test Voltage
60 second charge time
10% $H_3PO_4$ @ 21° C.
Capacitance - DF Testing:

18% $H_2SO_4$ @ 21° C.
120 Hz
75 V Ef Reform Anodization:

75 V Ef @ 60° C./0.1% $H_3PO_4$ Electrolyte
20 mA/g constant current
DC Leakage/Capacitance - ESR Testing:

DC leakage Testing ---

70% Ef (52.5 VDC) Test Voltage
60 second charge time
10% $H_3PO_4$ @ 21° C.
Capacitance - DF Testing:

18% $H_2SO_4$ @ 21° C.
120 Hz

Scott Density, oxygen analysis, phosphorus analysis, and BET analysis were determined according to the procedures set forth in U.S. Pat. Nos. 5,011,742; 4,960,471; and 4,964,906, all incorporated hereby in their entireties by reference herein.

EXAMPLES

Example 1

+10 mesh Ta hydride chips (99.2 gms) with approximately 50 ppm oxygen were mixed with 22 grams of $Nb_2O_5$ and placed into Ta trays. The trays were placed into a vacuum heat treatment furnace and heated to 1000° C. $H_2$ gas was admitted to the furnace to a pressure of +3psi. The temperature was further ramped to 1240° C. and held for 30 minutes. The temperature was lowered to 1050° C. for 6 minutes until all $H_2$ was swept from the furnace. While still holding 1050° C., the argon gas was evacuated from the furnace until a pressure of $5 \times 10^{-4}$ torr was achieved. At this point 700 mm of argon was readmitted to the chamber and the furnace cooled to 60° C.

The material was passivated with several cyclic exposures to progressively higher partial pressures of oxygen prior to removal from the furnace as follows: The furnace was backfilled with argon to 700 mm followed by filling to one atmosphere with air. After 4 minutes the chamber was evacuated to $10^{-2}$ torr. The chamber was then backfilled to 600 mm with argon followed by air to one atmosphere and held for 4 minutes. The chamber was evacuated to $10^{-2}$ torr. The chamber was then backfilled to 400 mm argon followed by air to one atmosphere. After 4 minutes the chamber was evacuated to $10^{-2}$ torr. The chamber was then backfilled to 200 mm argon followed by air to one atmosphere and held for 4 minutes. The chamber was evacuated to $10^{-2}$ torr. The chamber was backfilled to one atmosphere with air and held for 4 minutes. The chamber was evacuated to $10^{-2}$ torr. The chamber was backfilled to one atmosphere with argon and opened to remove the sample.

The powder product was separated from the tantalum chip getter by screening through a 40 mesh screen. The product was tested with the following results.

CV/g of pellets sintered to 1300° C.×10 minutes and formed to 35 volts=81,297 nA/CV (DC leakage)=5.0

Sintered Density of pellets=2.7 g/cc

Scott density=0.9 g/cc

Chemical Analysis (ppm)

| CV/g of pellets sintered to 1300° C. × 10 minutes and formed to 35 volts = | 81,297 |
|---|---|
| nA/CV (DC leakage) = | 5.0 |
| Sintered Density of pellets = | 2.7 g/cc |
| Scott density = | 0.9 g/cc |
| Chemical Analysis (ppm) | |
| C = | 70 |
| $H_2$ = | 56 |
| Ti = | 25 |
| Mn = | 10 |
| Sn = | 5 |
| Cr = | 10 |
| Mo = | 25 |
| Cu = | 50 |
| Pb = | 2 |
| Fe = | 25 |
| Si = | 25 |
| Ni = | 5 |

| -continued | |
|---|---|
| Al = | 5 |
| Mg = | 5 |
| B = | 2 |
| all others < limits | |

Example 2

Samples 1 through 20 are examples following similar steps as above with powdered $Nb_2O_5$ as indicated in the Table. For most of the examples, mesh sizes of the starting input material are set forth in the Table, for example 60/100, means smaller than 60 mesh, but larger than 100 mesh. Similarly, the screen size of some of the Ta getter is given as 14/40. The getters marked as "Ta hydride chip" are +40 mesh with no upper limit on particle size.

Sample 18 used Nb as the getter material (commercially available N200 flaked Nb powder from CPM). The getter material for sample 18 was fine grained Nb powder which was not separated from the final product. X-ray diffraction showed that some of the getter material remained as Nb, but most was converted to $NbO_{1.1}$ and NbO by the process as was the starting niobium oxide material $Nb_2O_5$.

Sample 15 was a pellet of $Nb_2O_5$, pressed to near solid density, and reacted with H, in close proximity to the Ta getter material. The process converted the solid oxide pellet into a porous slug of NbO suboxide. This slug was sintered to a sheet of Nb metal to create an anode lead connection and anodized to 35 volts using similar electrical forming procedures as used for the powder slug pellets. This sample demonstrates the unique ability of this process to make a ready to anodize slug in a single step from $Nb_2O_5$ starting material.

Figure 2:
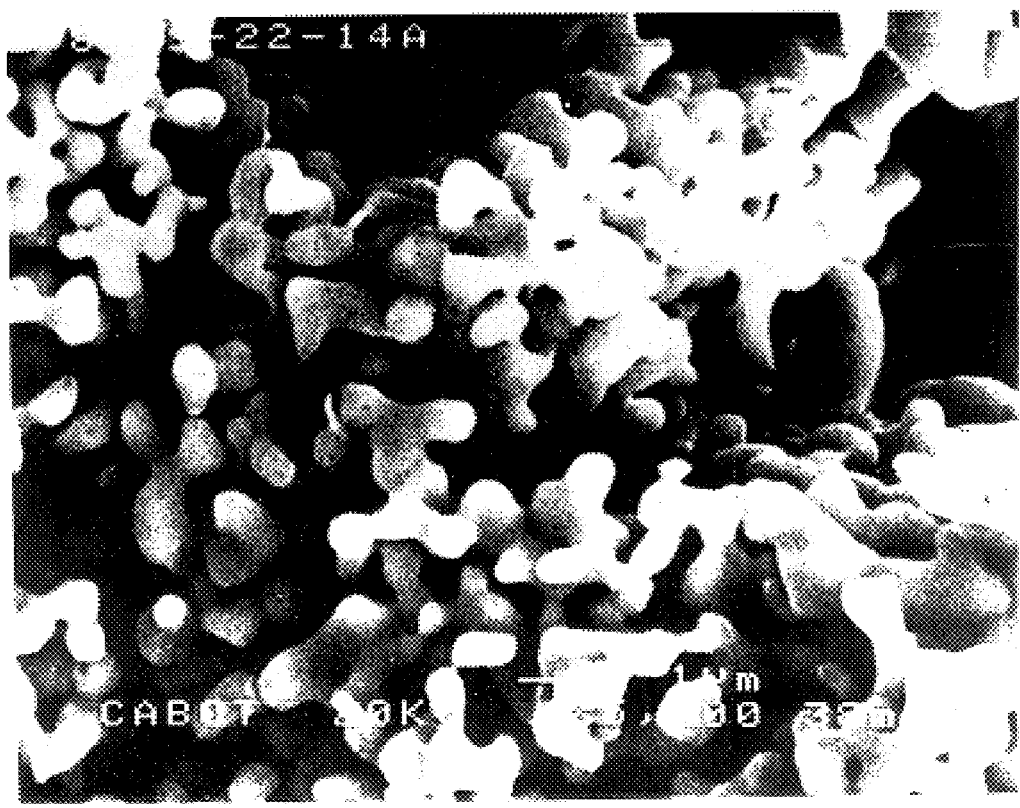
Figure 3:
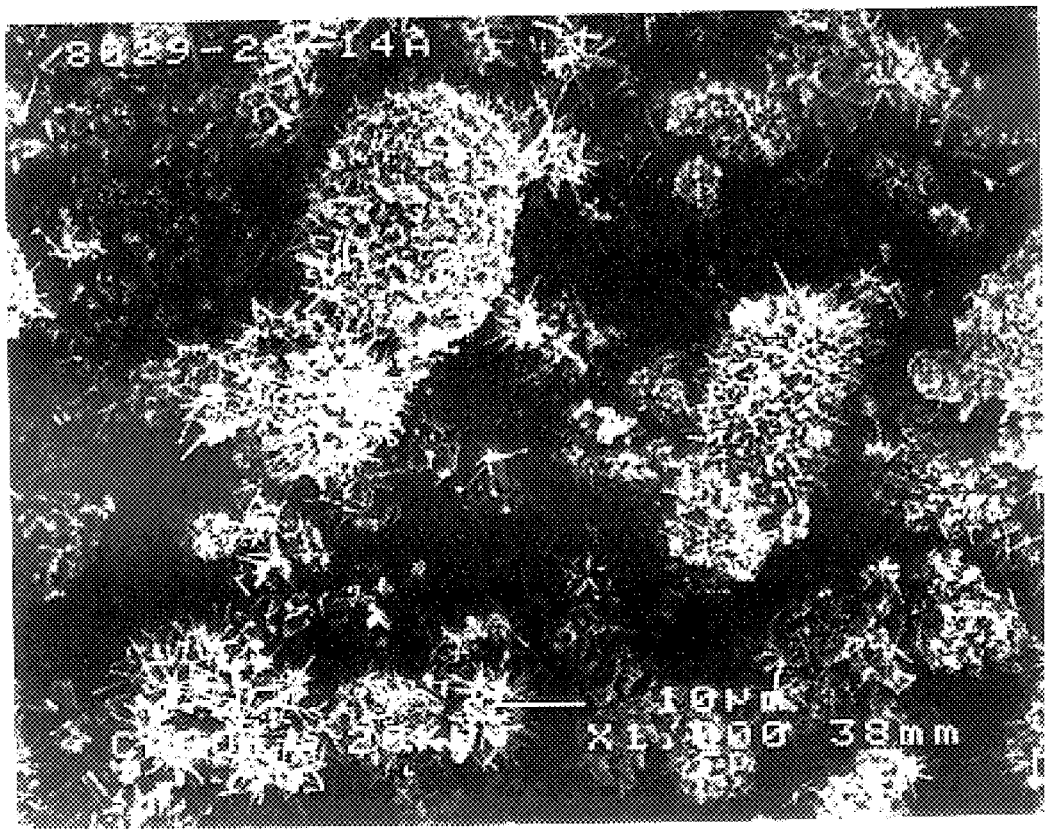
Figure 4:
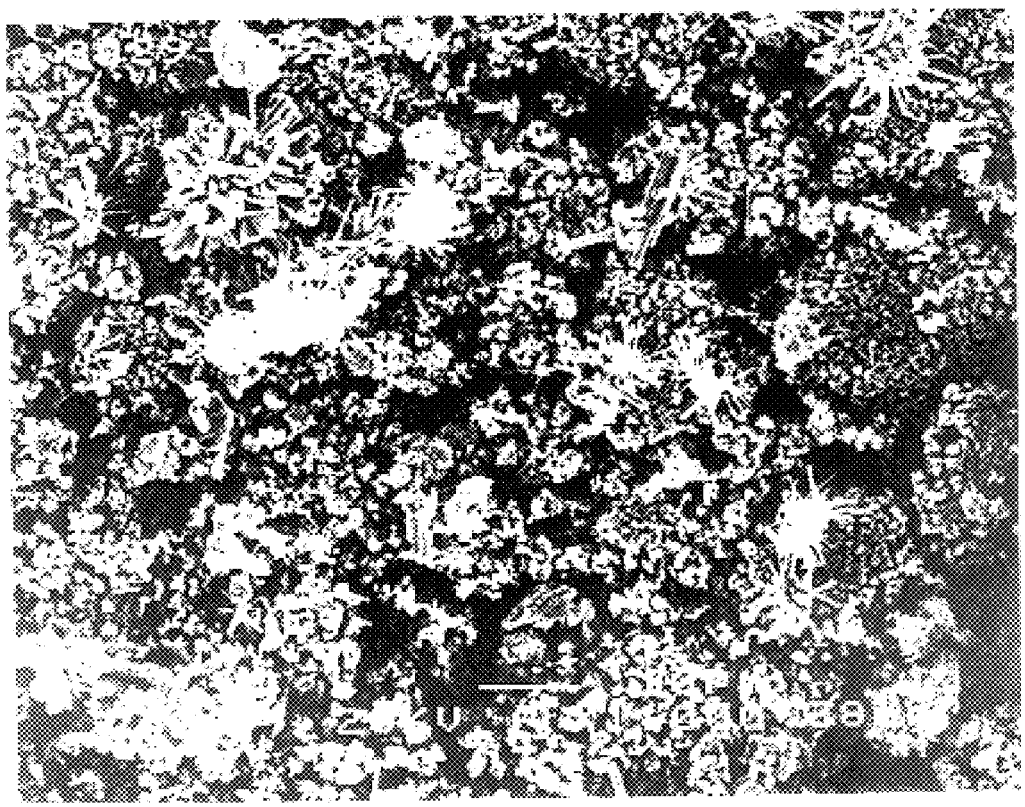
Figure 5:
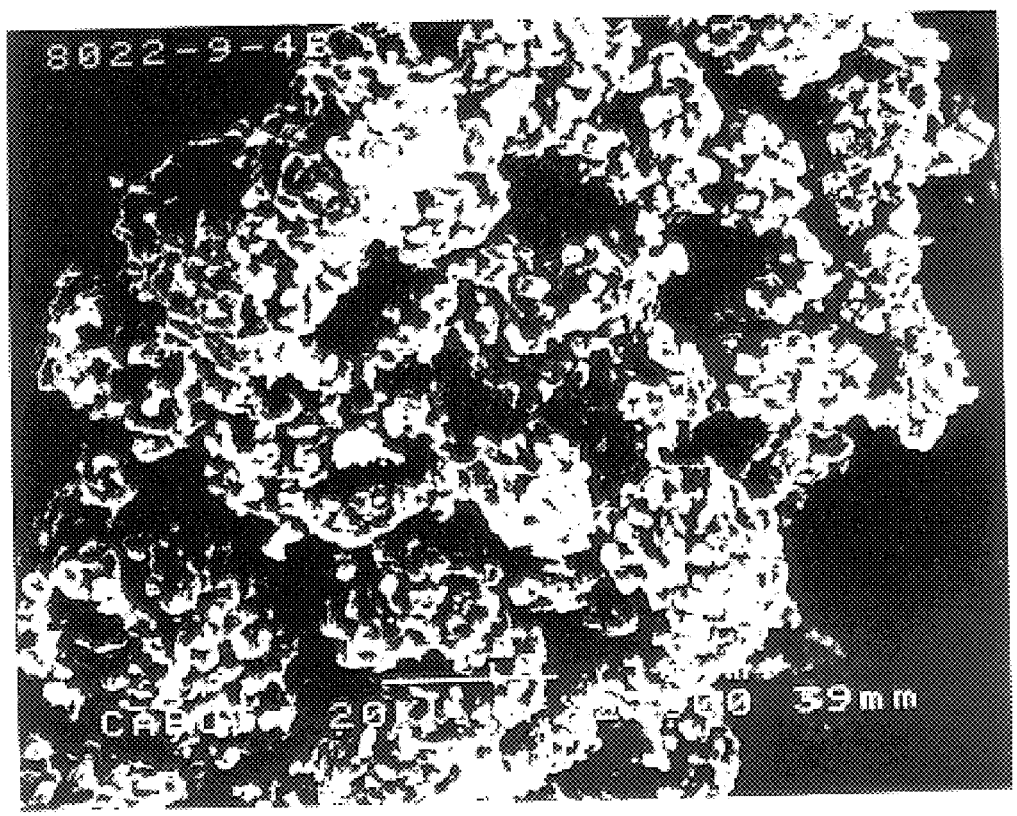
Figure 6:
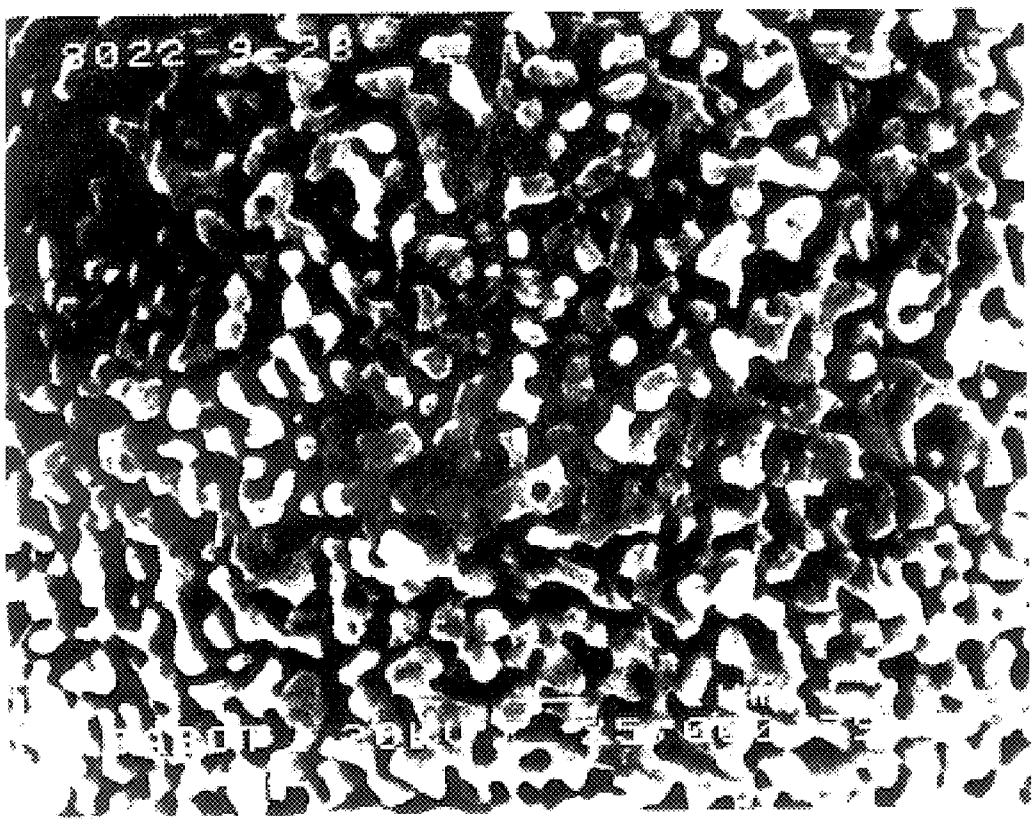
Figure 7:
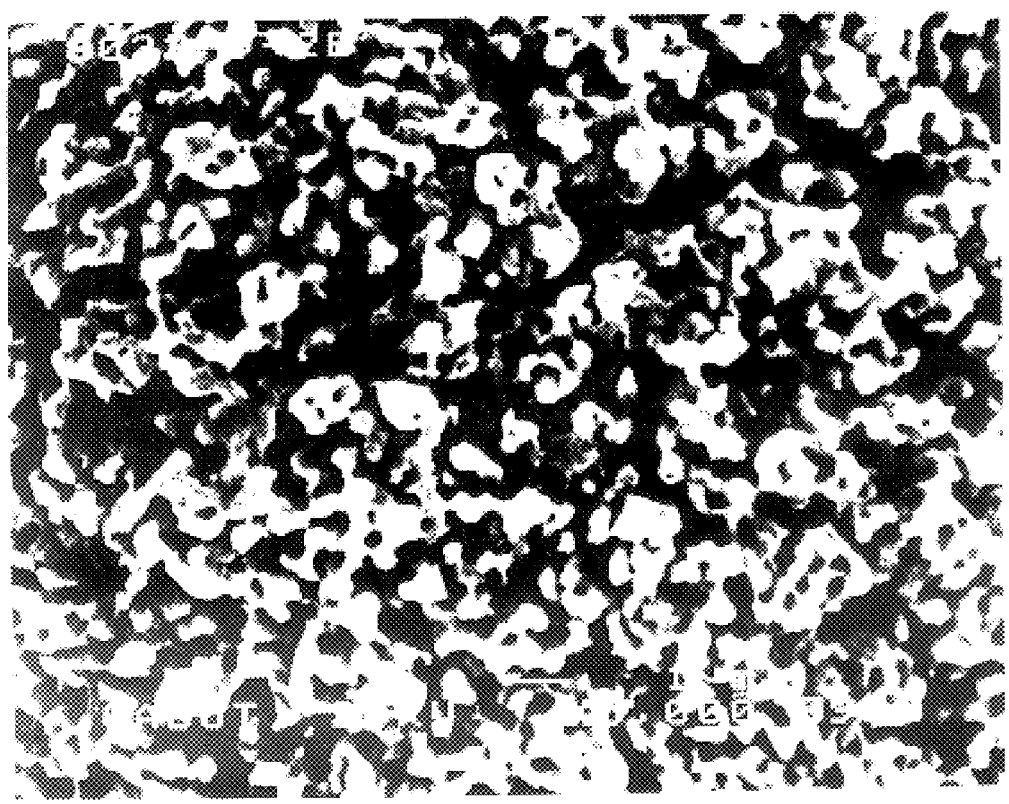
Figure 8:
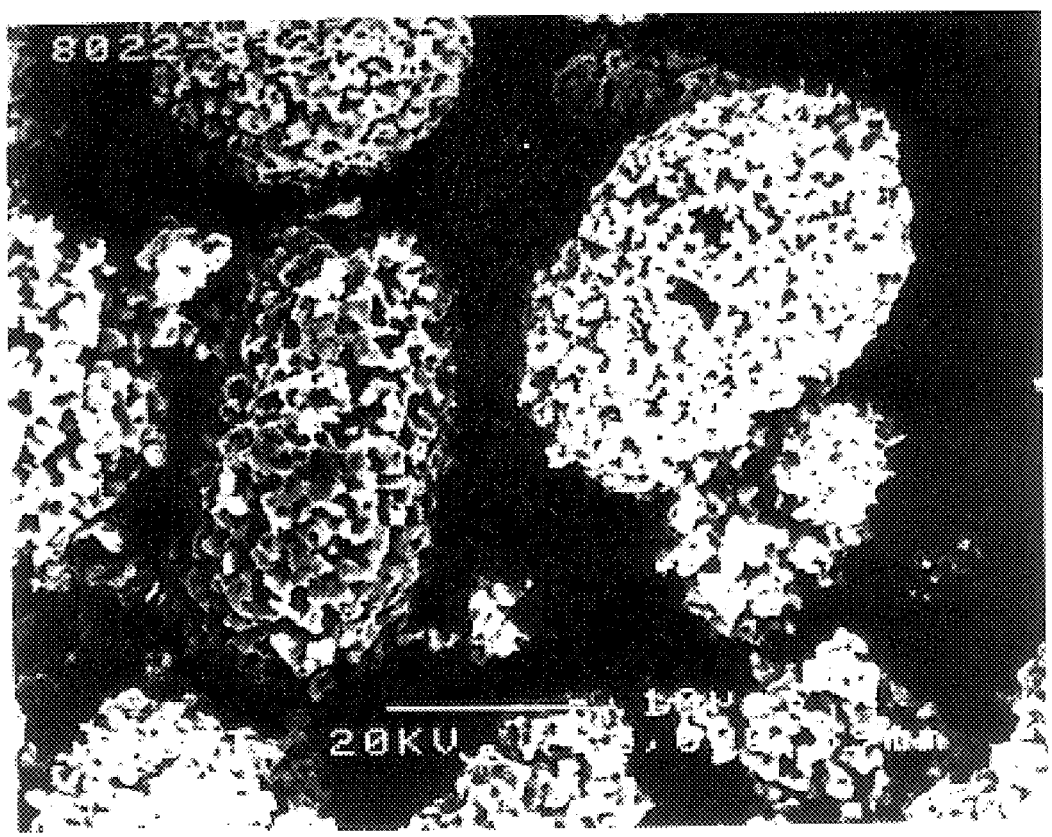
Figure 9:
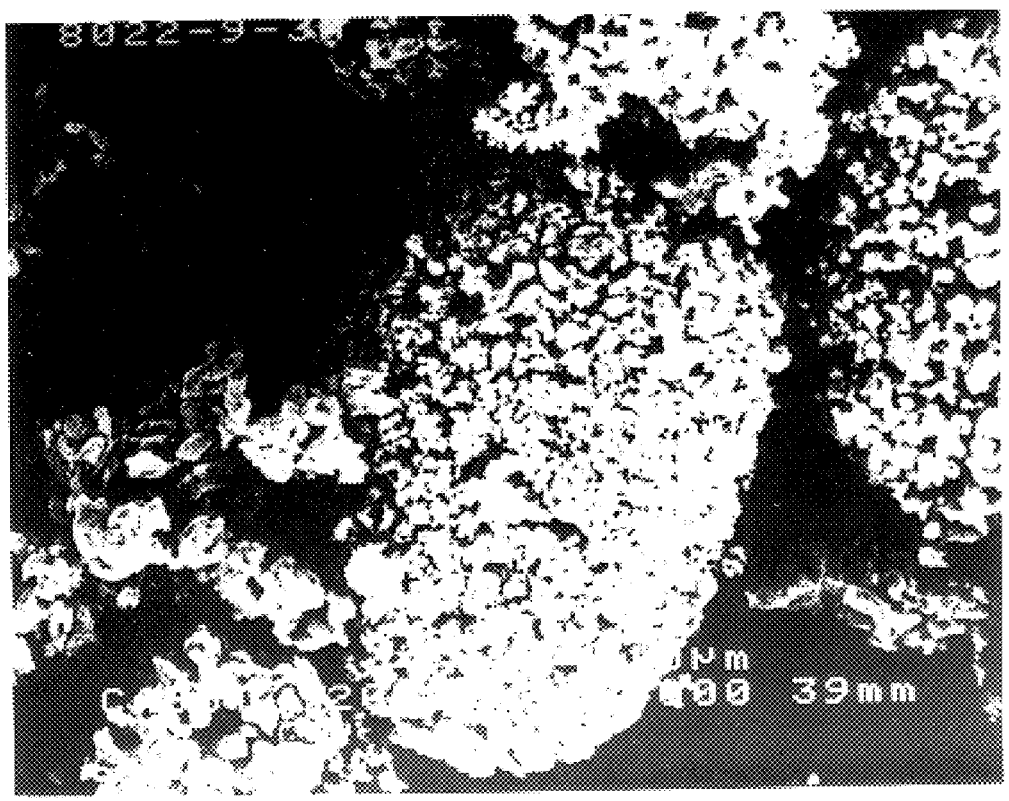
Figure 10:
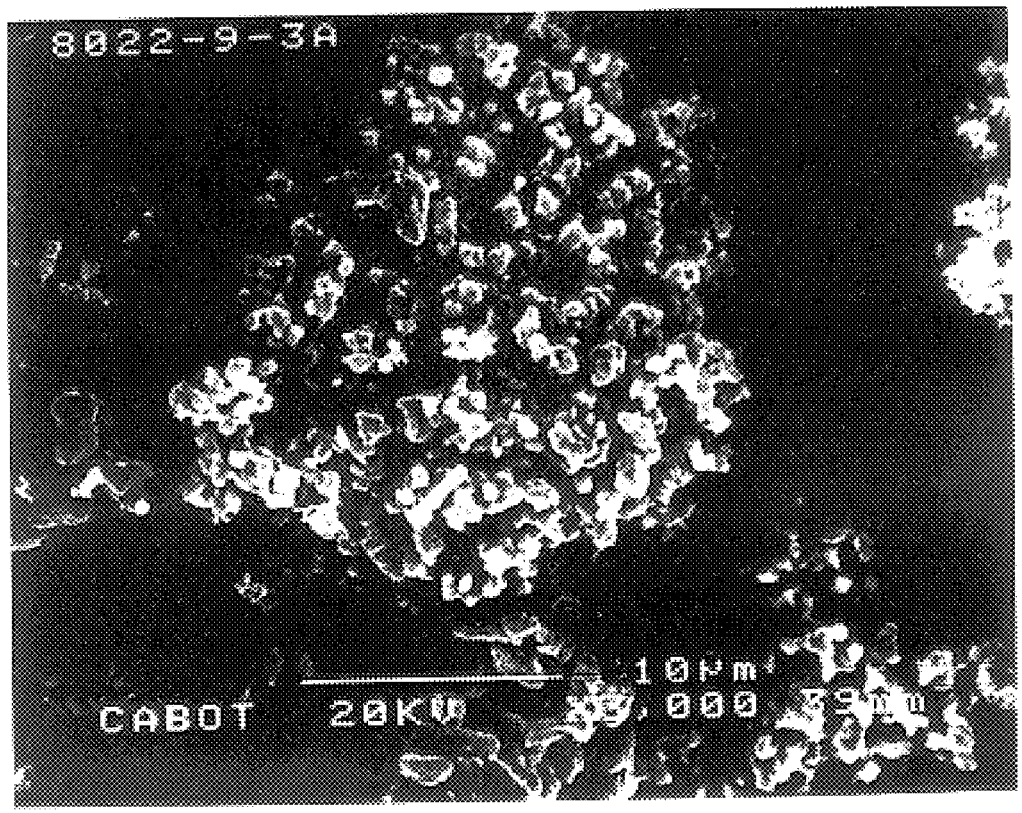
Figure 11:
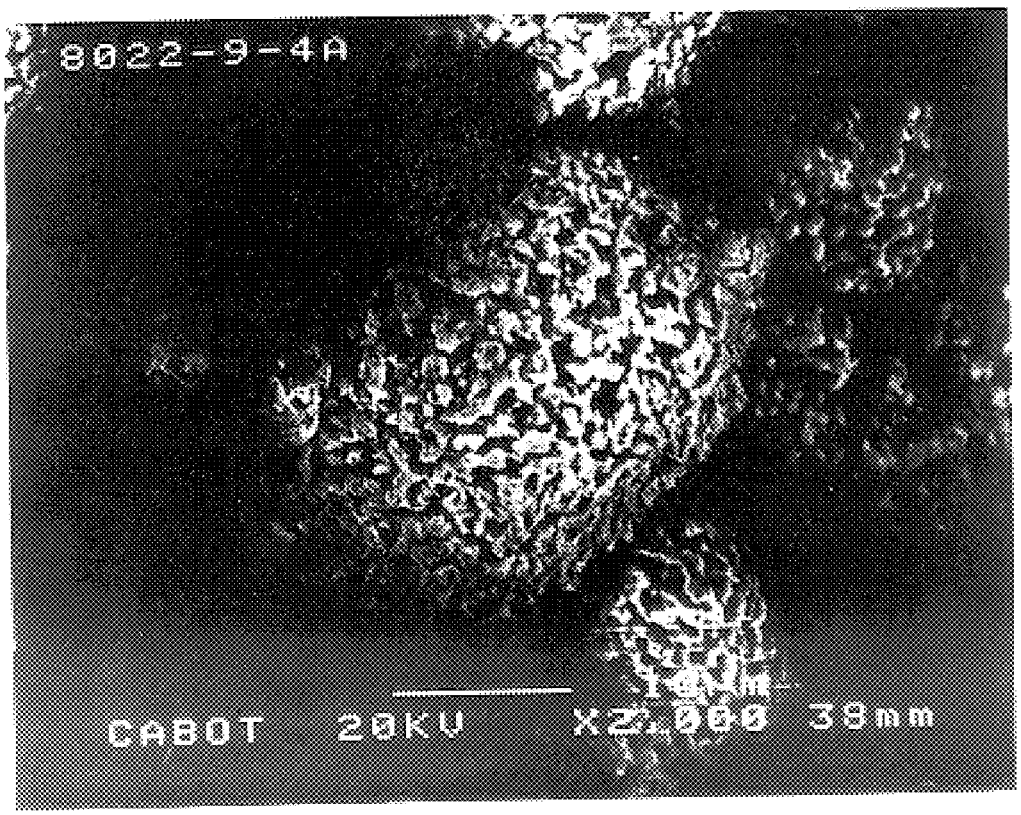

The Table shows the high capacitance and low DC leakage capable of anodes made from the pressed and sintered powders/pellets of the present invention. Microphotographs (SEMs) of various samples were taken. These photographs show the porous structure of the reduced oxygen niobium oxide of the present invention. In particular, FIG. 1 is a photograph of the outer surface of a pellet taken at 5,000 ×(sample 15). FIG. 2 is a photograph of the pellet interior of the same pellet taken at 5,000 ×. FIGS. 3 and 4 are photographs of the outer surface of the same pellet at 1,000 ×. FIG. 5 is a photograph of sample 11 at 2,000 ×and FIGS. 6 and 7 are photographs taken of sample 4 at 5,000 ×. FIG. 8 is a photograph taken of sample 3 at 2,000 ×and FIG. 9 is a photograph of sample 6 at 2,000 ×. Finally, FIG. 10 is a photograph of sample 6, taken at 3,000 ×and FIG. 11 is a photograph of sample 9 taken at 2,000 ×.

TABLE 1

| Sample | Input Material | Gms | Input Getter | Gms | Temp (° C.) | Time (min) | Hydrogen Pressure | XRD* Major 1** | XRD* Major 2** | XRD* Minor 1*** | XRD* Minor 2*** | 1300X35v CV/g | 1300X35v na/CV |
|---|---|---|---|---|---|---|---|---|---|---|---|---|---|
| 1 | −40 mesh calcined $Nb_2O_5$ | 20 (est) | Ta hydride chips | 40 (est) | 1240 | 30 | 3 psi | | | | | 81297 | 5 |
| 2 | 60/100 $Nb_2O_5$ | 23.4 | Ta hydride chips | 65.4 | 1250 | 30 | 3 psi | $NbO_{1.1}$ | NbO | TaO | | 115379 | 1.28 |
| 3 | 60/100 $Nb_2O_5$ | 23.4 | Ta hydride chips | 65.4 | 1250 | 30 | 3 psi | $NbO_{1.1}$ | NbO | TaO | | 121293 | 2.19 |
| 4 | 100/325 $Nb_2O_5$ | 32.3 | Ta hydride chips | 92.8 | 1250 | 30 | 3 psi | | | | | 113067 | 1.02 |
| 5 | 100/325 $Nb_2O_5$ | 32.3 | Ta hydride chips | 92.8 | 1250 | 30 | 3 psi | | | | | 145589 | 1.42 |
| 6 | 60/100 $Nb_2O_5$ | 26.124 | Ta hydride chips | 72.349 | 1250 | 90 | 3 psi | | | | | 17793 | 12.86 |
| 7 | 60/100 $Nb_2O_5$ | 26.124 | Ta hydride chips | 72.349 | 1250 | 90 | 3 psi | | | | | 41525 | 5.63 |
| 8 | 200/325 $Nb_2O_5$ | 29.496 | Ta hydride chips | 83.415 | 1250 | 90 | 3 psi | | | | | 17790 | 16.77 |
| 9 | 60/100 $Nb_2O_5$ | 20.888 | Ta hydride chips | 60.767 | 1200 | 90 | 3 psi | $NbO_{1.1}$ | NbO | $Ta_2O_5$ | | 63257 | 5.17 |
| 10 | 60/100 $Nb_2O_5$ | 20.888 | Ta hydride chips | 60.767 | 1200 | 90 | 3 psi | $NbO_{1.1}$ | NbO | $Ta_2O_5$ | | 69881 | 5.5 |
| 11 | 200/325 $Nb_2O_5$ | 23.936 | Ta hydride chips | 69.266 | 1200 | 90 | 3 psi | $NbO_{1.1}$ | NbO | $Ta_2O_5$ | | 61716 | 6.65 |
| 12 | 200/325 $Nb_2O_5$ | 23.936 | Ta hydride chips | 69.266 | 1200 | 90 | 3 psi | $NbO_{1.1}$ | NbO | $Ta_2O_5$ | | 68245 | 6.84 |
| 13 | 200/325 $Nb_2O_5$ | 15.5 | 14/40 Ta hydride | 41.56 | 1250 | 30 | 3 psi | $NbO_{0.7}$ | NbO | TaO | $NbO_2$ | 76294 | 4.03 |
| 14 | 200/325 Nb2O5 | 10.25 | 14/40 Ta hydride | 68.96 | 1250 | 30 | 3 psi | $NbO_{0.7}$ | NbO | TaO | $NbO_2$ | 29281 | 21.03 |
| 15 | $Nb_2O_5$ pellets | 3.49 | 14/40 Ta hydride | 25.7 | 1250 | 30 | 3 psi | | | | | 70840 | 0.97 |
| 16 | 200/325 $Nb_2O_5$ | 13.2 | 14/40 Ta hydride | 85.7 | 1200 | 30 | 3 psi | $NbO_2$ | $NbO_{0.7}$ | TaO | NbO | 5520 | 34.33 |
| 17 | 200/325 $Nb_2O_5$ | 14.94 | 14/40 Ta hydride | 41.37 | 1200 | 30 | 3 psi | | | | | 6719 | 38.44 |
| 18 | 200/325 $Nb_2O_5$ | 11.92 | N200 Nb powder | 21.07 | 1200 | 30 | 3 psi | Nb | $NbO_{1.1}$ | NbO | | 25716 | 4.71 |
| 19 | 200/325 $Nb_2O_5$ | 10 | 14/40 Ta hydride | 69 | 1250 | 30 | 100 Torr | | | | | 108478 | 1.95 |
| 20 | 200/325 $Nb_2O_5$ | 16 | 14/40 Ta hydride | 41 | 1250 | 30 | 100 Torr | | | | | 106046 | 1.66 |

*X-Ray Defraction Analysis Results
**Major 1 and 2 refer to primary components present by weight.
***Minor 1 and 2 refer to secondary components present by weight.
Samples 11 and 12 had the same input material. Samples 2 and 3 had the same input material.
Samples 6 and 7 had the same input material. Samples 9 and 10 had the same input material.

Example 3

This experiment was conducted to show the ability of the niobium oxides of the present invention to form at high formation voltages and yet retain an acceptable DC leakage. The niobium oxide of the present invention was compared to a capacitor formed from commercially available tantalum and niobium metal. In particular, Table 2 sets forth the basic characteristics of the materials that were used to form the capacitor for this example. The C606 tantalum is a commercially available product from Cabot Corporation. The niobium oxide used in Example 3 was prepared in manner similar to Example 1. Table 3 further set forth the chemical compositions of components other than the niobium metal for the niobium oxide of the present invention and the niobium metal which was used for comparison purposes. Tables 4–7 set forth the data obtained for each formation voltage starting at 15 volts and ending at 75 volts. The data is also plotted in FIG. 12. The particular capacitor anodes which were tested for DC leakage were formed using the stated formation voltage and in each case the sintering temperature was 1300° C. for 10 minutes and the formation temperature of the anode was 60° C. with the press density set forth in Table 2. Further, the anodes were formed in 0.1% $H_3PO_4$ electrolyte, with a 135 milliamps/g constant current up to the desired formation voltage which was held for 3 hours. The test conditions were the same as for the DC leakage tested in Example 1 (except as noted herein) including 10% $H_3PO_4$ at 21° C. The anode size of the Nb suboxide was 0.17 inch diameter. The anode size of the tantalum was 0.13 inch diameter and the anode size for the niobium was 0.19 inch diameter. The anode weight was as follows: niobium suboxide=200 mg; tantalum=200 mg; niobium=340 mg.

TABLE 2

| | Nb Sub-Oxide | Nb | Ta C606 (Commercial product) |
|---|---|---|---|
| BET, $m^2/g$ | 0.75 | 0.58 | Commercial spec |
| Scott density, $g/in^2$ | 20.7 | 23.8 | Commercial spec |
| Anode sintering density, g/cc | 3.0 | 4.1 | 5.3 |
| CV/g | 56,562 | 22,898 | 61,002 |
| Sintering conditions | 10 min @ 1300° C. | 10 min @ 1300° C. | 10 min @ 1300° C. |
| Formation temperature | 60° C. | 60° C. | 60° C. |

TABLE 3

| Element | Nb Oxide | Nb |
|---|---|---|
| C | 150 | 422 |
| O | 141,400 | 2399 |
| H | | 55 |
| Si | 30 | 250 |
| Ni | 10 | 20 |
| Fe | 200 | 100 |
| Cr | 40 | 50 |
| Ti | <5 | <5 |
| Mn | 25 | 25 |
| Sn | <5 | <5 |
| Ca | <50 | <50 |
| Al | 50 | 20 |
| W | <100 | <100 |
| Zr | <5 | <5 |
| Mg | 25 | 10 |
| B | <5 | 10 |
| Co | <5 | <5 |
| Cu | <5 | 10 |

Figure 12:
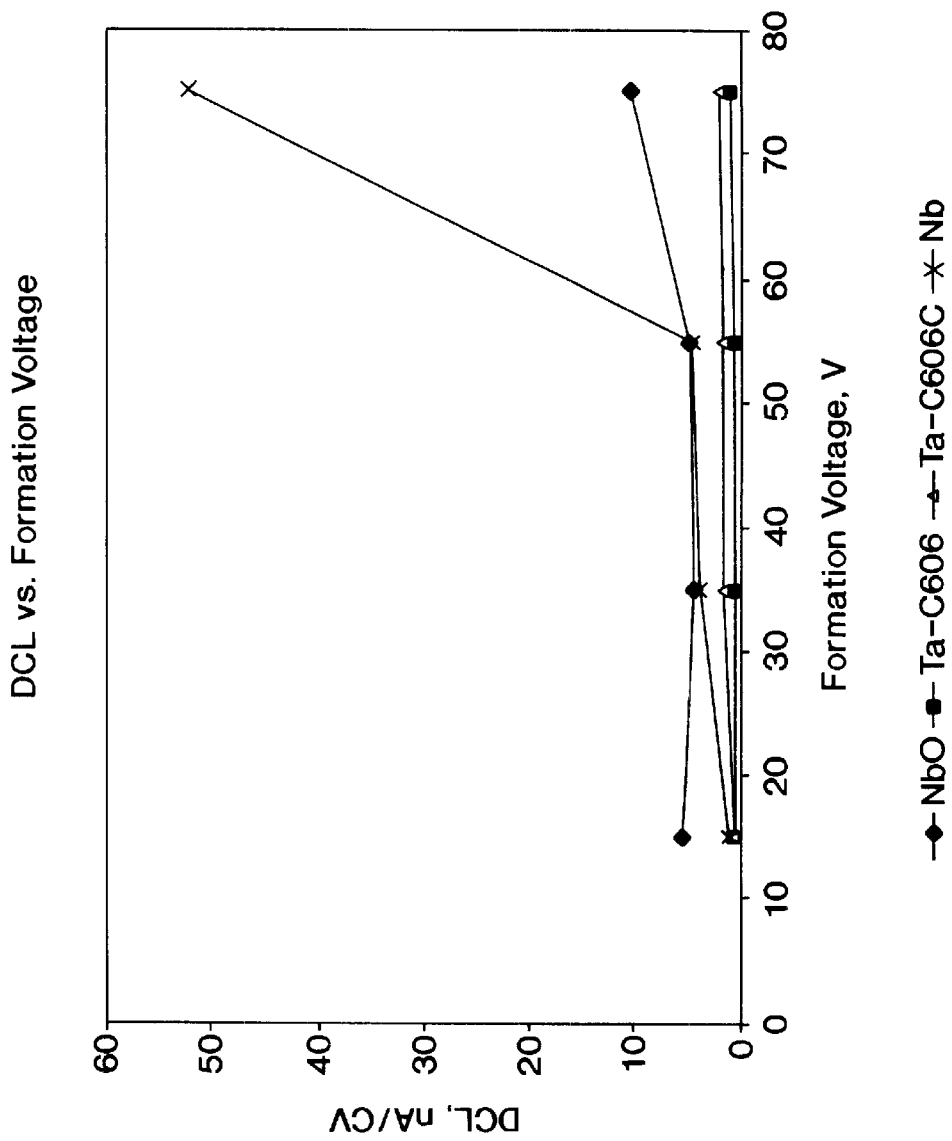
FIG. 12 is a graph plotting DC leakage vs. Formation voltage for a niobium oxide capacitor anode and other anodes made from niobium or tantalum.

As can be seen in FIG. 12 and Tables 4–7, while the DC leakage for capacitor anodes made from niobium metal increased dramatically at a formation voltage of 75 volts, the DC leakage for the capacitor anode formed from a niobium oxide of the present invention remain relatively stable. This is quite impressive considering the effect seen with respect to a capacitor anode formed from niobium metal. Thus, unlike niobium metal, the niobium oxides of the present invention have the ability to be formed into capacitor anodes and formed at high voltages while maintaining acceptable DC leakage which was not possible with anodes made simply from niobium metal. Thus, the niobium oxides of the present invention can be possible substitutes for anodes made from tantalum in certain applications which is quite beneficial considering niobium can be less expensive.

TABLE 4

|  | Nb Sub-Oxide | Ta | Ta | Nb |
|---|---|---|---|---|
| Anodization Voltage | 15.0 | 15.0 | 15.0 | 15.0 |
| (CV) | 11,037 | 13,095 | 12,635 | 7,893 |
| (CV/g) | 56,562 | 63,154 | 61,002 | 22,898 |
| (CV/g) (Corr) |  |  |  |  |
| (CV/cc) | 168,304 | 352,254 | 324,448 | 93,372 |
| (Ohms) | 0.82 | 0.92 | 0.90 | 0.89 |
| Charge time one (sec) | 30 | 30 | 30 | 30 |
| (uA) | 72.86 | 10.94 | 12.74 | 13.14 |
| *"FLIERS" | 0 | 0 | 0 | 0 |
| "GASSERS" | 0 | 0 | 0 | 0 |
| N= | 8 | 8 | 8 | 2 |
| (uA/g) | 373.37 | 52.75 | 61.51 | 38.12 |
| (nA/CV) | 6.60 | 0.84 | 1.01 | 1.66 |
| Charge time two (sec) | 60 | 60 | 60 | 60 |
| (uA) | 60.08 | 7.39 | 9.00 | 9.42 |
| "FLIERS" | 0 | 0 | 0 | 0 |
| "GASSERS" | 0 | 0 | 0 | 0 |
| N= | 8 | 8 | 8 | 2 |
| (uA/g) | 307.90 | 35.63 | 43.45 | 27.31 |
| (nA/CV) | 5.44 | 0.56 | 0.71 | 1.19 |
| Dia. Shkg (%) | 0.6 | 0.6 | −1.2 | 4.0 |
| Ds (g/cc) | 3.0 | 5.6 | 5.3 | 4.1 |

TABLE 5

|  | Nb Sub-Oxide | Ta | Ta | Nb |
|---|---|---|---|---|
| Anodization Voltage | 35.0 | 35.0 | 35.0 | 35.0 |
| (CV) | 10,445 | 12,678 | 12,130 | 7,977 |
| (CV/g) | 53,107 | 60,470 | 58,448 | 23,457 |
| (CV/g) (Corr) |  |  |  |  |
| (CV/cc) | 158,416 | 341,045 | 311,482 | 93,700 |
| (Ohms) | 0.92 | 1.04 | 1.02 | 0.95 |
| Charge time one (sec) | 30 | 30 | 30 | 30 |
| (uA) | 54.13 | 11.50 | 29.60 | 53.31 |
| *"FLIERS" | 0 | 1 | 0 | 0 |
| "GASSERS" | 0 | 0 | 0 | 0 |
| N= | 8 | 8 | 8 | 2 |
| (uA/g) | 275.23 | 54.86 | 142.64 | 156.77 |
| (nA/CV) | 5.18 | 0.91 | 2.44 | 6.68 |
| Charge time two (sec) | 60 | 60 | 60 | 60 |
| (uA) | 47.21 | 7.56 | 20.99 | 31.17 |
| "FLIERS" | 0 | 1 | 0 | 0 |
| "GASSERS" | 0 | 0 | 0 | 0 |
| N= | 8 | 8 | 8 | 2 |
| (uA/g) | 240.04 | 36.08 | 101.14 | 91.66 |

TABLE 5-continued

|  | Nb Sub-Oxide | Ta | Ta | Nb |
|---|---|---|---|---|
| (nA/CV) | 4.52 | 0.60 | 1.73 | 3.91 |
| Dia. Shkg (%) | 0.6 | 0.6 | −1.2 | 3.8 |
| Ds (g/cc) | 3.0 | 5.6 | 5.3 | 4.0 |

TABLE 6

|  | Nb Sub-Oxide | Ta | Ta | Nb |
|---|---|---|---|---|
| Anodization Voltage | 55.0 | 55.0 | 55.0 | 55.0 |
| (CV) | 9,476 | 11,448 | 10,878 | 7,894 |
| (CV/g) | 47,159 | 54,928 | 52,394 | 22,941 |
| (CV/g) (Corr) |  |  |  |  |
| (CV/cc) | 134,774 | 307,960 | 279,339 | 92,880 |
| (Ohms) | 1.35 | 1.21 | 1.18 | 1.08 |
| Charge time one (sec) | 30 | 30 | 30 | 30 |
| (uA) | 53.70 | 13.48 | 28.40 | 61.61 |
| *"FLIERS" | 0 | 0 | 0 | 0 |
| "GASSERS" | 0 | 0 | 0 | 0 |
| N= | 8 | 8 | 8 | 2 |
| (uA/g) | 267.23 | 64.65 | 136.80 | 179.05 |
| (nA/CV) | 5.67 | 1.18 | 2.61 | 7.80 |
| Charge time two (sec) | 60 | 60 | 60 | 60 |
| (uA) | 46.28 | 8.91 | 20.24 | 36.29 |
| "FLIERS" | 0 | 0 | 0 | 0 |
| "GASSERS" | 0 | 0 | 0 | 0 |
| N= | 8 | 8 | 8 | 2 |
| (uA/g) | 230.34 | 42.77 | 97.50 | 105.45 |
| (nA/CV) | 4.88 | 0.78 | 1.86 | 4.60 |
| Dia. Shkg (%) | 0.3 | 0.6 | −1.2 | 3.8 |
| Ds (g/cc) | 2.9 | 5.6 | 5.3 | 4.0 |

TABLE 7

|  | Nb Sub-Oxide | Ta | Ta | Nb |
|---|---|---|---|---|
| Anodization Voltage | 75.0 | 75.0 | 75.0 | 75.0 |
| (CV) | 5,420 | 10,133 | 9,517 | 7,872 |
| (CV/g) | 27,508 | 48,484 | 45,749 | 22,886 |
| (CV/g) (Corr) |  |  |  |  |
| (CV/cc) | 80,768 | 274,194 | 246,127 | 93,954 |
| (Ohms) | 4.58 | 1.37 | 1.31 | 1.31 |
| Charge time one (sec) | 30 | 30 | 30 | 30 |
| (uA) | 67.08 | 16.76 | 27.47 | 640.50 |
| *"FLIERS" | 0 | 0 | 0 | 0 |
| "GASSERS" | 0 | 0 | 0 | 0 |
| N= | 8 | 8 | 8 | 2 |
| (uA/g) | 340.40 | 80.17 | 132.04 | 1862.19 |
| (nA/CV) | 12.37 | 1.65 | 2.89 | 81.37 |
| Charge time two (sec) | 60 | 60 | 60 | 60 |
| (uA) | 55.91 | 10.97 | 19.90 | 412.20 |
| "FLIERS" | 0 | 0 | 0 | 0 |
| "GASSERS" | 0 | 0 | 0 | 0 |
| N= | 8 | 8 | 8 | 2 |
| (uA/g) | 283.75 | 52.48 | 95.67 | 1198.43 |
| (nA/CV) | 10.32 | 1.08 | 20.9 | 52.37 |
| Dia. Shkg (%) | 0.1 | 0.9 | −0.9 | 4.3 |
| Ds (g/cc) | 2.9 | 5.7 | 5.4 | 4.14 |

Other embodiments of the present invention will be apparent to those skilled in the art from consideration of the specification and practice of the invention disclosed herein.

It is intended that the specification and examples be considered as exemplary only, with a true scope and spirit of the invention being indicated by the following claims.

What is claimed is:

1. A capacitor anode comprising a niobium oxide having an atomic ratio of niobium to oxygen of 1: less than 2.5 and being formed at a formation voltage of about 6 volts or higher, and having a DC leakage of less than 15 nA/CV wherein said DC leakage is determined from an anode sintered at 1500° C. for 10 minutes and formed at a formation temperature of 60° C.

2. The capacitor anode of claim 1, wherein said DC leakage is less than about 12 nA/CV.

3. The capacitor anode of claim 1, wherein said DC leakage is less than 6 nA/CV.

4. The capacitor anode of claim 1, wherein said DC leakage is less than 2 nA/CV.

5. The capacitor anode of claim 1, wherein said niobium oxide is NbO.

6. The capacitor anode of claim 1, wherein said niobium oxide is NbO, oxygen depleted NbO, niobium metal with NbO, or combinations thereof.

7. The capacitor anode of claim 1, wherein said niobium oxide contains nitrogen.

8. The capacitor anode of claim 7, wherein said nitrogen is present in an amount of from 31,000 ppm to about 130,000 ppm $N_2$.

9. A capacitor anode comprising a niobium oxide having an atomic ratio of niobium to oxygen of 1: less than 2.5, and being formed at a formation voltage of about 6 volts or higher, and having a capacitance of 40,000 CV/g or greater at a sintering temperature of from about 1200° C. to about 1600° C. for 10 minutes and at a formation temperature of 85° C.

10. The capacitor anode of claim 9, wherein said capacitance is from about 40,000 to about 60,000 CV/g.

11. The capacitor anode of claim 9, wherein said niobium oxide is NbO.

12. The capacitor anode of claim 9, wherein said niobium oxide is NbO, oxygen depleted NbO, niobium metal with NbO, or combinations thereof.

13. The capacitor anode of claim 9, wherein said niobium oxide contains nitrogen.

14. The capacitor anode of claim 13, wherein said nitrogen is present in an amount of from 31,000 ppm to about 130,000 ppm $N_2$.

15. A capacitor anode comprising a niobium oxide having an atomic ratio of niobium to oxygen of 1: less than 2.5, and being formed at a formation voltage of about 6 volts or higher and having a capacitance of 20,000 CV/g or greater, wherein said capacitance is determined at a sintering temperature of 1300° C. for 10 minutes and at a formation temperature of 85° C.

16. The capacitor anode of claim 15, wherein said capacitance is from about 20,000 to about 60,000 CV/g.

17. The capacitor anode of claim 15, wherein said formation voltage is from about 20 to about 80 volts.

18. The capacitor anode of claim 15, wherein said niobium oxide is NbO.

19. The capacitor anode of claim 15, wherein said niobium oxide is NbO, depleted NbO, niobium metal with NbO, or combinations thereof.

20. A capacitor anode comprising a niobium oxide having an atomic ratio of niobium to oxygen of 1: less than 2.5, wherein the powder forming the capacitor anode has a burning rate of less than 5 mm/s.

21. The capacitor anode of claim 20, wherein said burning rate is 2 mm/s or lower.

22. The capacitor anode of claim 20, wherein said burning rate is about 1 mm/s to about 5 mm/s.

23. The capacitor anode of claim 20, wherein said niobium oxide contains nitrogen.

24. The capacitor anode of claim 23, wherein said nitrogen is present in an amount of from 31,000 ppm to about 130,000 ppm $N_2$.

25. A capacitor anode comprising a niobium oxide having an atomic ratio of niobium to oxygen of 1: less than 2.5, and having a minimum ignition energy of 100 mJ or greater.

26. The capacitor anode of claim 25, wherein said minimum ignition energy is 500 mJ or greater.

27. The capacitor anode of claim 25, wherein said minimum ignition energy is below 10 J.

28. The capacitor anode of claim 25, wherein said niobium oxide is NbO.

29. The capacitor anode of claim 25, wherein said niobium oxide is NbO, oxygen depleted NbO, niobium metal with NbO, or combinations thereof.

30. A method of forming a capacitor anode comprising a niobium oxide having an atomic ratio of niobium to oxygen of 1: less than 2.5, comprising forming said niobium oxide into the shape of an anode and sintering at a temperature of from about 1200° C. to about 1600° C. for a time of from about 1 minute to about 30 minutes;

anodizing at from about 16 to about 75 volts at a formation temperature of about 85° C.;

annealing said anode at a temperature of from about 300 to about 350° C. for a time of from about 10 minutes to about 60 minutes; and manganizing said anode at a temperature of from about 220° to 28° C.

31. A method to at least partially reduce a niobium oxide, comprising heat treating a starting niobium oxide in the presence of a getter material in an atmosphere permitting the transfer of oxygen atoms from the starting niobium oxide to the getter material for a sufficient time and sufficient temperature such that the starting niobium oxide and said getter material form an oxygen reduced niobium oxide.

32. The method of claim 31, wherein said getter material is a niobium powder.

33. The method of claim 31, wherein said oxygen reduced niobium oxide is NbO.

34. The method of claim 31, wherein said oxygen reduced niobium oxide is NbO, oxygen depleted NbO, niobium metal with NbO, or combinations thereof.

35. The method of claim 31, wherein said atmosphere is a hydrogen containing atmosphere.

36. The method of claim 31, wherein said atmosphere is hydrogen.

37. The method of claim 31, wherein said heat treating occurs at a temperature of from about 800° C. to about 1900° C. for a time of from about 5 minutes to about 100 minutes.

38. The method of claim 31, wherein said oxygen reduced niobium oxide is NbO, $NbO_{0.7}$, $NbO_{1.1}$ or combinations thereof.

39. The method of claim 31, wherein said oxygen reduced niobium oxide has an atomic ratio of niobium to oxygen of 1: less than 2.5.

40. The method of claim 31, wherein said oxygen reduced niobium oxide has an atomic ratio of niobium to oxygen of 1: less than 2.0.

* * * * *